United States Patent
Ezaki et al.

(10) Patent No.: US 10,544,342 B2
(45) Date of Patent: Jan. 28, 2020

(54) THERMALLY CONDUCTIVE RESIN COMPOSITION

(71) Applicant: Kaneka Corporation, Osaka (JP)

(72) Inventors: Toshiaki Ezaki, Osaka (JP); Kazunori Saegusa, Osaka (JP)

(73) Assignee: KANEKA CORPORATION, Osaka (JP)

(*) Notice: Subject to any disclaimer, the term of this patent is extended or adjusted under 35 U.S.C. 154(b) by 104 days.

(21) Appl. No.: 15/915,879

(22) Filed: Mar. 8, 2018

(65) Prior Publication Data

US 2018/0194982 A1 Jul. 12, 2018

Related U.S. Application Data

(63) Continuation of application No. PCT/JP2016/004061, filed on Sep. 6, 2016.

(30) Foreign Application Priority Data

Sep. 9, 2015 (JP) .................. 2015-177869

(51) Int. Cl.
| | |
|---|---|
| *C09K 5/14* | (2006.01) |
| *F21V 29/503* | (2015.01) |
| *F21V 29/87* | (2015.01) |
| *F21V 29/76* | (2015.01) |
| *C08K 3/04* | (2006.01) |
| *F21S 45/47* | (2018.01) |
| *C08L 67/02* | (2006.01) |
| *F21Y 115/10* | (2016.01) |

(52) U.S. Cl.
CPC .............. *C09K 5/14* (2013.01); *C08K 3/042* (2017.05); *C08L 67/02* (2013.01); *F21S 45/47* (2018.01); *F21V 29/503* (2015.01); *F21V 29/763* (2015.01); *F21V 29/87* (2015.01); *C08K 2201/001* (2013.01); *C08K 2201/005* (2013.01); *C08L 2203/20* (2013.01); *C08L 2205/025* (2013.01); *F21Y 2115/10* (2016.08)

(58) Field of Classification Search
CPC . C08K 3/00; F21S 45/47; C08L 67/00; C08L 101/00; C08L 67/02; F21V 29/503; F21V 29/76; F21V 29/87

USPC ......................................................... 524/424
See application file for complete search history.

(56) References Cited

U.S. PATENT DOCUMENTS

| | | | | |
|---|---|---|---|---|
| 2014/0043754 | A1* | 2/2014 | Hartmann | H05K 7/20454 361/679.54 |
| 2017/0167716 | A1 | 6/2017 | Ezaki et al. | |

FOREIGN PATENT DOCUMENTS

| | | | |
|---|---|---|---|
| EP | 3305519 | A1 | 4/2018 |
| JP | S57-61045 | A | 4/1982 |
| JP | H10-60287 | A | 3/1998 |
| JP | 2001060413 | A | 3/2001 |
| JP | 2011-016937 | * | 1/2011 |
| JP | 2011-231159 | * | 11/2011 |
| JP | 2011-231159 | A | 11/2011 |
| JP | 2012-72351 | A | 4/2012 |
| JP | 5225558 | B2 | 7/2013 |
| JP | 5226270 | B2 | 7/2013 |
| JP | 2014-74083 | A | 4/2014 |
| JP | 2014-78335 | A | 5/2014 |
| WO | 2013/133181 | A1 | 9/2013 |
| WO | 2014/024743 | A1 | 2/2014 |
| WO | 2016/035680 | A1 | 3/2016 |

OTHER PUBLICATIONS

Machine translation of JP 2011-016937 (Year: 2011).*
Machine translation of JP 2011-231159 (Year: 2011).*
Extended European Search Report issued in European Application No. 16843938.8, dated Mar. 27, 2019 (6 pages).
International Search Report issued in PCT/JP2016/004061; dated Dec. 13, 2016 (2 pages).

* cited by examiner

*Primary Examiner* — Doris L Lee
(74) *Attorney, Agent, or Firm* — Osha Liang LLP

(57) ABSTRACT

Provided is a thermally conductive resin composition having a specific gravity of 1.4-2.0 and an In-Plane thermal conductivity of 1 W/(m·K) or higher, and containing at least (A) 30-90% by mass of a thermoplastic resin, (B) 9-69% by mass of an inorganic filler having a thermal conductivity of 1 W/(m·K) or higher, and (C) 0.05-10% by mass of a crystallization accelerator.

10 Claims, 4 Drawing Sheets

THERMALLY CONDUCTIVE RESIN COMPOSITION

TECHNICAL FIELD

One or more embodiments of present invention relate to a thermally conductive resin composition containing a thermoplastic resin and a thermally conductive inorganic filler.

BACKGROUND

Since electric and electronic devices have been reduced in size and highly integrated, heat generation of mounting components and a temperature increase of use environment become significant. Therefore, there is an increasing demand for the improvement of a heat dissipation property of constituent members. Currently, constituent members made of metals or ceramics with high thermal conductivity are used especially for heat dissipation of automobile members and high-power LEDs, and a resin material having high thermal conductivity and molding processability is demanded to reduce the weight and to improve the processability and increase the freedom of shape.

As a method of imparting thermal conductivity to a resin, there has been known a method of adding a filler with high thermal conductivity such as graphite or the like.

For example, in PTL 1, a resin composition showing excellent thermal conductivity and containing specific graphite particles is disclosed.

PTL 2 discloses an electrically conductive resin composition containing a thermoplastic resin and a graphite powder having an aspect ratio of 3 or less in 70% or more of the particles.

However, when a blending amount of the thermally conductive filler is increased in these techniques so as to increase the thermal conductivity of the resin composition, the flowability and strength of the resin composition are greatly lowered to result in making the molding difficult in some cases. Therefore, measures are required to improve the thermal conductivity without lowering the molding processability and strength of the resin composition.

CITATION LIST

Patent Literature

PTL 1: Japanese Patent No. 5225558
PTL 2: JP-2001-60413 A

SUMMARY OF INVENTION

One or more embodiments of the present invention provide a thermally conductive resin composition excellent in thermal conductivity and molding processability, and a molded article containing the same.

The present inventors have focused on the possibility that in a thermally conductive resin composition including a thermoplastic resin and a thermally conductive filler, the thermoplastic resin existing between the thermally conductive fillers may hinder the heat transfer and have found that by blending a crystallization accelerator with the thermally conductive resin composition, the crystallization of the thermoplastic resin is accelerated and the thermal conductivity of the thermally conductive filler is exhibited more efficiently to be able to obtain a resin composition excellent in thermal conductivity and molding processability. One or more embodiments of the present invention is shown by the following items 1) to 14).

1) A thermally conductive resin composition having a specific gravity of 1.4-2.0 and an In-Plane thermal conductivity of 1 W/(m·K) or higher, and containing at least (A) 30-90% by mass of a thermoplastic resin, (B) 9-69% by mass of an inorganic filler having a thermal conductivity of 1 W/(m·K) or higher, and (C) 0.05-10% by mass of a crystallization accelerator.

2) The thermally conductive resin composition according to the above 1), wherein the crystallization accelerator (C) is an organic crystallization accelerator.

3) The thermally conductive resin composition according to the above 2), wherein the organic crystallization accelerator is an organic nitrogen compound or an ester compound having a number average molecular weight of from 200 to 10,000.

4) The thermally conductive resin composition according to any one of the above 1) to 3), wherein the inorganic filler (B) is one or more kinds selected from the group consisting of boron nitride, aluminum nitride, magnesium oxide, graphite, and carbon fiber.

5) The thermally conductive resin composition according to any one of the above 1) to 4), wherein the inorganic filler (B) is a flacked graphite having a volume average particle diameter of from 10 to 700 µm, a fixed carbon content of 98% by mass or more, and an aspect ratio of 21 or more.

6) The thermally conductive resin composition according to the above 5), wherein the flacked graphite is natural graphite.

7) The thermally conductive resin composition according to any one of the above 1) to 6), wherein the thermoplastic resin (A) is a polyester resin.

8) The thermally conductive resin composition according to the above 7), wherein the polyester resin is one or more kinds selected from the group consisting of polybutylene terephthalate, polyethylene terephthalate, and polyester-polyether copolymer.

9) The thermally conductive resin composition according to the above 8), wherein the polybutylene terephthalate, polyethylene terephthalate, and polyester-polyether copolymer have each a number average molecular weight of 12,000 to 70,000.

10) The thermally conductive resin composition according to any one of the above 1) to 9), further containing 0.01 to 5% by mass of at least one compound selected from the group consisting of an epoxy compound, a carbodiimide compound, and an oxazoline compound.

11) A method of producing the thermally conductive resin composition as defined in any one of the above 1) to 10), including a step of melt-kneading each component to produce the thermally conductive resin composition, wherein the inorganic filler (B) is a flacked graphite, and the flacked graphite before the melt-kneading has a volume average particle diameter of from 201 to 700 µm, a fixed carbon content of 98% by mass or more, and an aspect ratio of 21 or more.

12) A heat dissipation casing composed of the thermally conductive resin composition as defined in any one of the above 1) to 10).

13) A heat dissipation chassis composed of the thermally conductive resin composition as defined in any one of the above 1) to 10).

14) An automotive LED lamp heat sink composed of the thermally conductive resin composition as defined in any one of the above 1) to 10).

The thermally conductive resin composition of one or more embodiments of the present invention has excellent molding processability and high thermal conductivity. Further, according to one or more embodiments of the present invention, it is possible to provide a thermally conductive resin composition also excellent in fogging resistance and heat resistance.

DESCRIPTION OF EMBODIMENTS (Thermoplastic Resin (A))

Figure 1A:
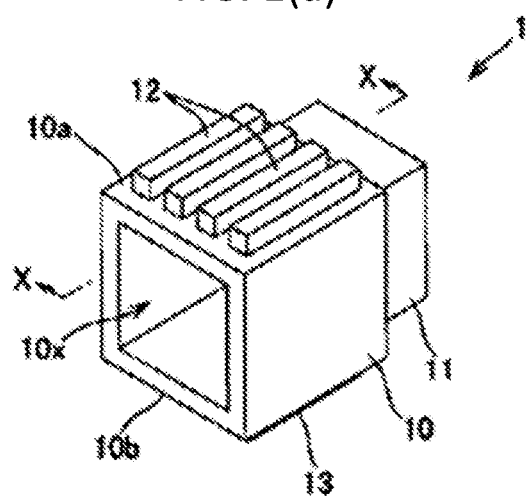
FIGS. 1(a) and 1(b) are schematic diagrams showing a configuration of one embodiment of a heat dissipation casing for housing an in-vehicle CCD camera.

Examples of the thermoplastic resin (A) used in one or more embodiments of the present invention include aromatic vinyl resins such as polystyrene; vinyl-cyanide resins such as polyaciylonitrile; chlorine resins such as polyvinyl chloride; polymethacrylic acid ester resins such as polymethyl methacrylate and polyacrylic acid ester resins; polyolefin resins such as polyethylene, polypropylene, and cyclic polyolefin resins; polyvinyl ester resins such as polyvinyl acetate; polyvinyl alcohol resins and derivative resins of the respective aforementioned resins; polymethacrylic acid resins and metal salt resins thereof, polyacrylic acid resins and metal salt resins thereof, poly-conjugate diene resins; polymers obtained by polymerizing maleic acid, fumaric acid, and derivatives thereof, polymers obtained by polymerizing maleimide-based compounds; amorphous polyester resins such as amorphous semi-aromatic polyesters and amorphous wholly aromatic polyesters; crystalline polyester resins such as crystalline semi-aromatic polyesters and crystalline wholly aromatic polyesters; polyamide resins such as aliphatic polyamides, aliphatic-aromatic polyamides, and wholly aromatic polyamides; polycarbonate resins; polyurethane resins; polysulfone resins; polyalkylene oxide resins; cellulosic resins; polyphenylene ether resins; polyphenylene sulfide resins; polyketone resins; polyimide resins; polyamide-imide resins; polyetherimide resins; polyether ketone resins; polyether ether ketone resins; polyvinyl ether resins; phenoxy resins; fluorine resins; silicone resins; liquid crystal polymers; random, block or graft copolymers of these exemplified polymers, and the like. These thermoplastic resins can be used singly or in combination of two or more kinds thereof. In a case where two or more kinds of the thermoplastic resins are used in combination, it is possible to add thereto a compatibilizer or the like if necessary. These thermoplastic resins (A) may be appropriately used according to the purpose.

Among these thermoplastic resins, a thermoplastic resin a part or whole of which is crystalline or liquid crystalline may be preferable because such a thermoplastic resin tends to provide a high thermal conductivity of an obtained resin composition and enables the inorganic filler (B) to be easily included in the resin. These crystalline or liquid crystalline thermoplastic resins may be entirely crystalline or partially crystalline or liquid crystalline in such a state that only a specific block in the molecules of a block or graft copolymer resin is crystalline or liquid crystalline. A degree of crystallinity of the resin is not limited to a specific degree. As the thermoplastic resin, a polymer alloy of a non-crystalline resin and a crystalline or liquid crystalline resin may be used. The degree of crystallinity of the resin is not particularly limited.

Some thermoplastic resins each of which is partially or entirely crystalline or liquid crystalline are non-crystalline when such resins are used solely or molded in specific molding processing conditions, although the resins can be crystallized. In the case of using such a resin, a part or whole of the resin can be crystallized in some cases by devising a molding process, for example, by performing an extension process or a post crystallization process.

In one or more embodiments, a polyester resin may be preferable from the viewpoint that an effect of the present invention can be more easily expressed. Specific examples of the crystalline polyester resin include polyethylene terephthalate, polypropylene terephthalate, polybutylene terephthalate, polyethylene-2,6-naphthalate, polybutylene naphthalate, poly 1,4-cyclohexylenedimethylene terephthalate, and polyethylene-1,2-bis(phenoxy)ethane-4,4'-dicarboxylate, and crystalline copolymer polyesters such as polyethylene isophthalate/terephthalate, polybutylene terephthalate/isophthalate, polybutylene terephthalate/decane dicarboxylate, polycyclohexane dimethylene terephthalate/isophthalate, and polyester/polyether.

The polyester/polyether (hereinafter referred to as a polyester-polyether copolymer) is a block or random copolymer composed of a polyester unit and a polyether unit. Examples of the polyether units include polyalkylene oxide units such as polyethylene oxide units and polybutylene oxide units, modified polyether units, and the like. The modified polyether unit may be represented by the following general formula (1). From the viewpoints of moldability and heat resistance, the polyester-polyether copolymer may be a polymer composed of 50 to 80% by weight of the aromatic polyester unit and 20 to 50% by weight of the modified polyether unit, or a polymer composed of 60 to 80% by weight of the aromatic polyester unit and 20 to 40% by weight of the modified polyether unit.

Examples of a method of producing the polyester-polyether copolymer include, but are not limited to, (1) a direct esterification method of three substances of an aromatic dicarboxylic acid, a diol, and a modified polyether, (2) a transesterification method of three substances of an aromatic dicarboxylic acid dialkyl ester, a diol, a modified polyether and/or a modified polyether ester, (3) a method of adding a modified polyether during or after transesterification of an aromatic dicarboxylic acid dialkyl ester and a diol and then performing polycondensation, and (4) a method of using a high molecular aromatic polyester, mixing the aromatic polyester with a modified polyether, and then performing transesterification under a melting and reduced pressure, wherein in the methods of (1) to (4), a catalyst containing an antimony compound and optionally a germanium compound is used. From the viewpoint of controllability of a material composition, the method (4) may be employed.

Examples of the antimony compound include antimony trioxide, antimony pentoxide, antimony acetate, and antimony glycoxide. These compounds may be used singly or in combination of two or more of them. Among these antimony compounds, antimony trioxide may be preferable. The catalyst amount of an antimony compound added in the polymerization may be 50 to 2000 ppm by weight, or 100 to 1000 ppm by weight, of the amount of the resin, from the viewpoints of a reaction rate and economy.

Examples of the germanium compound used as the catalyst include germanium oxides such as germanium dioxide; germanium alkoxides such as germanium tetraethoxide and germanium tetraisopropoxide; germanium hydroxide and its alkali metal salts; germanium glycolate; germanium chloride; germanium acetate; and the like. These germanium compounds may be used singly or in combination of two or more of them. Among these germanium compounds, germanium dioxide may be preferable. The catalyst amount of germanium dioxide added in the polymerization may be 50 to 2000 ppm by weight, or 100 to 1000 ppm by weight, of the amount of the resin, from the viewpoints of a reaction rate and economy.

The aromatic dicarboxylic acid may be terephthalic acid, and may be, for example, isophthalic acid, diphenyl dicarboxylic acid, and diphenoxyethane dicarboxylic acid. In addition to these aromatic dicarboxylic acids, another aromatic oxycarboxylic acid such as oxybenzoic acid, or an aliphatic or alicyclic dicarboxylic acid such as adipic acid, sebacic acid, or cyclohexane-1,4-dicarboxylic acid may be used in combination in a small ratio (15% or less).

The diol is a low molecular weight glycol component forming ester units, and specific examples thereof include low molecular weight glycols having 2 to 10 carbon atoms such as ethylene glycol, trimethylene glycol, tetramethylene glycol, hexanediol, decanediol, and cyclohexanedimethanol. Ethylene glycol, trimethylene glycol, and tetramethylene glycol may be particularly preferable because they can be easily obtained.

A methyl group may be preferable as the alkyl group in the aromatic dicarboxylic acid dialkyl ester from the viewpoint of transesterification.

With respect to a solution viscosity of the aromatic polyester in the polymer, the logarithmic viscosity (IV), determined in a mixed solvent of phenol/tetrachloroethane=1/1 (weight ratio) at 25° C. at a concentration of 0.5 g/dl, may be within the range from 0.3 to 2.0 or from 0.5 to 1.5, from the viewpoints of impact resistance, chemical resistance, and molding processability of the obtained molded article.

(Aromatic Polyester Unit)

The aromatic polyester unit is a polymer or copolymer obtained from an aromatic dicarboxylic acid or its derivative capable of producing an ester and a diol or its derivative capable of producing an ester, and is typically an alternating polycondensation product. Examples of the aromatic polyester unit include one or more units selected from the group consisting of a polyethylene terephthalate unit, a polybutylene terephthalate unit, and a polypropylene terephthalate unit.

Specific examples of the aromatic polyester unit include a polyethylene terephthalate unit, a polyethylene terephthalate copolymer unit, a polybutylene terephthalate unit, a polybutylene terephthalate copolymer unit, a polypropylene terephthalate unit, and a polypropylene terephthalate copolymer unit, and more preferable examples may include one or more units selected from the group consisting of a polyethylene terephthalate unit, a polybutylene terephthalate unit, and a polypropylene terephthalate unit.

(Modified Polyether Unit)

The modified polyether unit is a unit represented by the general formula (1) below, wherein m and n which are each the number of repeating units of $OR^9$ units or $R^{10}O$ units in the general formula (1) are each independently an integer of 1 or more. The number average of (m+n) may be 2 to 50, or 10 to 50, or 18 to 50.

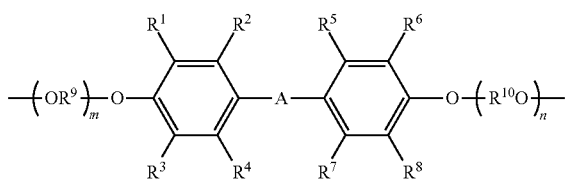

General Formula 1

(In the formula, -A- is —O—, —S—, —SO—, —SO$_2$—, —CO—, an alkylene group having 1 to 20 carbon atoms or an alkylidene group having 6 to 20 carbon atoms; $R^1$, $R^2$, $R^3$, $R^4$, $R^5$, $R^6$, $R^7$, and $R^8$ are each independently a hydrogen atom, a halogen atom or a monovalent hydrocarbon group having 1 to 5 carbon atoms; $R^9$ and $R^{10}$ are each independently a divalent hydrocarbon group having 1 to 5 carbon atoms; m and n each represent the number of repeating units of $OR^9$ or $R^{10}O$ units and are each independently an integer of 1 or more; and the number average of m+n is 2 to 50.)

From the viewpoint of availability, the modified polyether unit is a unit obtained by removing two terminal hydrogen atoms from a compound represented by the general formula (2) below, and the formula weight is 314 in a case where (m+n) is 2, and is 2426 in a case where (m+n) is 50. Thus, the molecular weight of the compound represented by the general formula (2) may be 316 to 2430, or 670 to 2430, or 1020 to 2430, or 1330 to 2000.

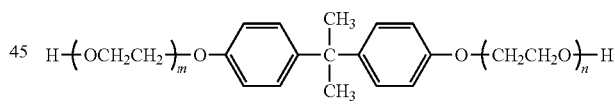

General Formula 2

Among these crystalline polyester resins, from the viewpoints of molding processability and mechanical properties, it may be preferable to use polyethylene terephthalate, polypropylene terephthalate, polybutylene terephthalate, polyethylene-2,6-naphthalate, polybutylene naphthalate, poly-1,4-cyclohexylenedimethylene terephthalate, and polyester-polyether copolymers. From the viewpoints of low costs and easy availability, polybutylene terephthalate, polyethylene terephthalate, and polyester-polyether copolymer may be more preferred.

The number average molecular weight of the thermoplastic resin (A) is a value measured using polystyrene as a standard and a solution in which a sample is dissolved and prepared in a mixed solvent containing p-chlorophenol and toluene in a volume ratio of 3:8 at a concentration of 2.5% by weight with a high-temperature GPC (Viscotek: 350 HT-GPC System) at a column temperature of 80° C. and with a differential refractometer (RI) as a detector.

The number average molecular weight of the thermoplastic resin (A), in particular, the polybutylene terephthalate, the polyethylene terephthalate, and the polyester-polyether copolymer may be 12,000 to 70,000, or 15,000 to 60,000, or 16,000 to 55,000, or 17,000 to 40,000. If the number average molecular weight of these resins is less than 12,000, mechanical strength may be reduced in some cases, and if the number average molecular weight is more than 50,000, molding may be difficult in some cases.

The content of the thermoplastic resin (A) may be 30 to 90% by mass, or 30 to 80% by mass, or 35 to 75% by mass, with respect to 100% by mass of the entire thermally conductive resin composition. When the content of the thermoplastic resin (A) is less than 30% by mass, the molding processability is remarkably deteriorated and molding may be difficult in some cases, whereas when such content exceeds 90% by mass, excellent thermal conductivity may not be exhibited in some cases.

(Inorganic Filler (B))

In one or more embodiments the thermal conductivity of the inorganic filler (B) when used alone in the present invention is 1 W/(m·K) or higher or 10 W/(m·K) or higher, or 30 W/(m·K) or higher, or 200 W/(m·K) or higher. The upper limit of the thermal conductivity of the inorganic filler when used alone is not particularly limited, and the higher the thermal conductivity, the more preferable. In general, an inorganic filler having a thermal conductivity of 3000 W/(m·K) or less, or 2500 W/(m·K) or less, is used.

As the inorganic filler in one or more embodiments of the present invention, known fillers can be widely used as long as they satisfy the thermal conductivity mentioned above. Specific examples of the inorganic filler include a metal filler such as aluminum and nickel; a low melting point alloy having a liquidus temperature of 300° C. or more and a solidus temperature of 150° C. or more and 250° C. or less; a metal oxide such as aluminum oxide, magnesium oxide, silicon oxide, beryllium oxide, copper oxide, and copper suboxide; a metal nitride such as aluminum nitride and silicon nitride; a metal carbide such as silicon carbide; a metal carbonate such as magnesium carbonate; an insulating carbon material such as diamond; a metal hydroxide such as aluminum hydroxide and magnesium hydroxide; alumina; boron nitride; graphite; glass fiber; carbon fiber; potassium titanate whisker, silicon nitride fiber; carbon nanotube; talc; and wollastonite. One or two or more of these can be used. Among them, boron nitride, aluminum nitride, magnesium oxide, graphite, and carbon fiber may be preferable from the viewpoint of thermal conductivity and easy availability, and graphite may be more preferable because it is inexpensive and has high thermal conductivity.

The shape of the inorganic filler (B) is not particularly limited, and examples thereof include various shapes such as a flacked shape, a fiber shape, a flake shape, a plate shape, a spherical shape, a particle shape, an earthy shape, a fine particle shape, a nano-particle shape, an agglomerated particle shape, a tube shape, a nanotube shape, a wire shape, a rod shape, an irregular shape, a rugby ball shape, a hexahedron shape, a combined particle shape obtained by combining a large particle and a fine particle, and a liquid form.

The content of the inorganic filler (B) may be 9 to 69% by mass, or 15 to 65% by mass, or 20 to 60% by mass, with respect to 100% by mass of the entire thermally conductive resin composition.

In one or more embodiments, the shape of the graphite used in the present invention is not particularly limited, but flacked graphite may be preferable from the viewpoint that the thermal conductivity can be easily improved by the crystallization accelerating effect of the thermoplastic resin (A). Further, flacked graphite having specific physical properties may be more preferable, since it can improve thermal conductivity and molding processability. Specifically, the volume average particle diameter of the flacked graphite in the molded article made of the thermally conductive resin composition may be 10 to 700 μm, or 40 to 700 μm, or 50 to 500 μm, or from 50 to 300 μm. When the volume average particle diameter is less than 10 μm, the thermal conductivity of the resin composition tends to decrease. The larger the particle diameter is, the higher the thermal conductivity tends to be. However, when the volume average particle diameter exceeds 700 μm, the strength of the resin composition may decrease in some cases. The volume average particle diameter can be measured by a laser diffraction method, a light scattering method or the like.

The fixed carbon content of the flacked graphite may be 98% by mass or more, or 98.5% by mass or more, or 99% by mass or more. If the fixed carbon content is less than 98% by mass, the thermal conductivity tends to decrease. The fixed carbon content can be measured according to JIS M8511.

In one or more embodiments, the aspect ratio of the flacked graphite is 21 or more in the molded article made of the thermally conductive resin composition. As for the upper limit of the aspect ratio, the higher the better, and the upper limit is not particularly limited, but the range may be 10,000 or less, or 5,000 or less, or 3,000 or less. The aspect ratio can be calculated from the maximum diameter/thickness by measuring each length of the maximum diameter and the thickness of the flacked graphite by an electron microscope or the like.

The particle size distribution of the flacked graphite before melt-kneading or in the molded article is not particularly limited. However, a ratio $D_{80}/D_{20}$ of a particle diameter $D_{80}$ when a cumulative volume obtained by measuring the particle size distribution is 80% to a particle diameter $D_{20}$ when the cumulative volume is 20% is 1 to 20, or 1 to 10, or 1 to 5.

In one or more embodiments, from the viewpoint that the effect of improving the thermal conductivity by the crystallization accelerator of the present invention can be more easily exhibited, graphite which is liable to be flaked during extrusion or molding may be preferable, and among them, flacked graphite may be more preferred. Generally, the smaller the distance between thermally conductive fillers in the molded article, the easier it is to form a heat transfer path between the thermally conductive fillers, so that the thermal conductivity tends to be improved, but the thermoplastic resin may not be sufficiently crystallized in some cases. By the crystallization technique of one or more embodiments of the present invention, the thermoplastic resin existing between the thermally conductive fillers can be microcrystallized, and the thermal conductivity of the thermoplastic resin can be further enhanced.

In one or more embodiments, the thermally conductive resin composition of the present invention is produced by melt-kneading a thermoplastic resin (A), an inorganic filler (B), a crystallization accelerator (C), and other components. The volume average particle diameter of the flacked graphite before melt-kneading may be 201 to 700 μm, or 230 to 650 μm, or 250 to 400 μm. The aspect ratio of the flacked graphite before melt-kneading may be 21 or more. The upper limit of the aspect ratio may be as high as possible, and is not particularly limited, but the aspect ratio may be 3,000 or less, or 1,000 or less, or 500 or less. Regarding the fixed carbon content, it shall not change before and after melt-kneading or molding process. In general, graphite tends to be crushed in a melt-kneading or a molding process. Thus, as the volume average particle diameter of graphite before the melt-kneading increases, the volume average particle diameter of the graphite after the melt-kneading or the molding process is kept large, so that the thermal conductivity and the molding processability increase.

The flacked graphite used in one or more embodiments of the present invention may be any of natural graphite, artificial graphite, or a combination of natural graphite and artificial graphite, and natural graphite may be preferable from the viewpoint of availability at low costs. The graphite may be α-graphite, β-graphite, or a combination thereof.

The inorganic filler (B) other than the flacked graphite may be a natural product or a synthesized one. In the case of natural products, production areas and the like are not particularly limited and can be appropriately selected.

(Crystallization Accelerator (C))

In one or more embodiments the crystallization accelerator (C) used in the present invention functions to increase the crystallinity of the thermoplastic resin (A) and to refine the crystal size, and includes a so-called crystallization nucleating agent. By blending the crystallization accelerator (C), it is possible to increase the degree of crystallinity of the thermoplastic resin (A) to improve the mold releasability at the time of molding, as well as to further enhance the thermal conductivity of the thermally conductive resin composition containing the thermoplastic resin (A) and the inorganic filler (B).

As the crystallization accelerator (C), known ones can be used, and either an inorganic crystallization accelerator or an organic crystallization accelerator may be used, or a mixture thereof may be used. An organic crystallization accelerator may be preferable from the viewpoint that a crystallization accelerating effect can be easily obtained with a small amount.

In one or more embodiments, the content of the crystallization accelerator (C) used in the present invention is 0.05 to 10% by mass, or 0.1 to 5% by mass, or 0.1 to 3% by mass, with respect to 100% by mass of the entire thermally conductive resin composition. When the content of the crystallization accelerator is less than 0.05% by mass, crystallization may not be sufficiently promoted in some cases. When the content of the crystallization accelerator exceeds 10% by mass, the fogging resistance may decrease.

Specific examples of the inorganic crystallization accelerator include carbon black, silica, calcium carbonate, synthetic silicic acid and silicate, zinc oxide, halloysite clay, kaolin, basic magnesium carbonate, mica, quartz powder, diatomaceous earth, dolomite powder, titanium oxide, zinc oxide, antimony oxide, barium sulfate, calcium sulfate, alumina, calcium silicate, and the like.

The inorganic crystallization accelerator has a different effect as a crystal nucleus accelerator depending on its particle size. The average particle size may be 10 μm or less, or 5 μm or less, or 2 μm or less.

Examples of the organic crystallization accelerator include sodium benzoate, sodium oxalate, higher fatty acid alkali metal salts, organic nitrogen compounds, ester compounds, and the like.

The organic nitrogen compound has a melting point of 300° C. or more, or 350° C. or more. From the viewpoint of fogging resistance, the organic nitrogen compound in which volatile gas is less likely to be generated may be preferable, and the 1% weight reduction temperature may be 300° C. or more, or 350° C. or more, or 400° C. or more. ADK STAB NA-05 manufactured by ADEKA Corporation can be mentioned as a specific example of the organic nitrogen compound satisfying the above temperature.

The alkali metal salt type organic crystallization accelerator is liable to cause molecular breakage of the thermoplastic resin (A) at the time of high-temperature heat molding and sometimes decreases the fogging resistance, so that the organic crystallization accelerator not containing an alkali metal salt may be preferred. The organic crystallization accelerator may be ester compounds, among which an ester compound containing a polyester chain or a polyalkylene glycol chain may be more preferred.

The alcohol component for forming the ester compound to be used for the crystallization accelerator (C) may be a dihydric alcohol having 2 to 25 carbon atoms. Specific examples of the dihydric alcohol include aliphatic glycols (e.g. ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, etc.); polyalkylene glycols (e, g. diethylene glycol, dipropylene glycol, etc.); ethylene oxide adducts of hydrogenated bisphenol A, bisphenol A or bisphenol S; cyclic or aromatic ring-containing dihydric alcohols (e.g. 1,4-cyclohexanedimethanol, 1,4-cyclohexanediol, 1,2-cyclohexanediol, bishydroxyethoxybenzene, etc.). These alcohols are used singly or as a mixture of two or more kinds thereof.

In one or more embodiments, as the alcohol component for forming the ester compound to be used for the crystallization accelerator (C) of the present invention, it is possible to use a monohydric alcohol having 4 to 18 carbon atoms in addition to the above-mentioned dihydric alcohol having 2 to 25 carbon atoms. Examples of the monohydric alcohol having 4 to 18 carbon atoms include aliphatic alcohols such as butanol, hexanol, isohexanol, heptanol, octanol, isooctanol, 2-ethylhexanol, nonanol, isononanol, 2-methyloctanol, decanol, isodecanol, undecanol, dodecanol, tridecanol, tetradecanol, hexadecanol, and octadecanol; alicyclic alcohols such as cyclohexanol; and aromatic alcohols such as benzyl alcohol, 2-phenylethanol, 1-phenylethanol, 2-phenoxyethanol, 3-phenyl-1-propanol, and 2-hydroxyethyl benzyl ether, and these can be used singly or as a mixture of two or more kinds thereof.

Examples of the acid component for forming the ester compounds to be used for the crystallization accelerator (C) include aliphatic dibasic acids having 4 to 14 carbon atoms, aromatic polybasic acids containing two or more carboxylic acid groups and having 8 to 18 carbon atoms, and aromatic monobasic acids. Examples of the aliphatic dibasic acid having 4 to 14 carbon atoms include adipic acid, sebacic acid, azelaic acid, dodecanedicarboxylic acid, and the like. Examples of the aromatic polybasic acid containing two or more carboxylic acid groups and having 8 to 18 carbon atoms include phthalic acid, isophthalic acid, terephthalic acid, 2,6-naphthalenedicarboxylic acid, α,β-bis(4-carboxyphenoxy)ethane, 4,4'-biphenyldicaiboxylic acid, trimellitic acid, trimesic acid, pyromellitic acid, biphenyltetracarboxylic acid, and the like. Also, alicyclic polybasic acids such as 1,4-cyclohexanedicarboxylic acid, 1,3-cyclohexanedicarboxylic acid, and hexahydrophthalic anhydride can be used. These polybasic acids may be used singly or as a mixture of two or more thereof.

As the acid component for forming the ester compounds to be used for the crystallization accelerator (C), monobasic acids having 2 to 22 carbon atoms can be used in addition to the above-mentioned acids. Examples of the monobasic acid having 2 to 22 carbon atoms include aliphatic monobasic acids having 6 to 22 carbon atoms derived from animal or vegetable fats and oils (e.g. coconut oil, palm oil, palm kernel oil, cocoa butter, wood wax, olive oil, kapok oil, castor oil, dehydrated castor oil, rapeseed oil, rice bran oil, cottonseed oil, soybean oil, safflower oil, linseed oil, tung oil, beef tallow, lard, cod oil, etc.), or hardened oil thereof, or synthetic monobasic acids having 2 to 18 carbon atoms (e.g. acetic acid, butyric acid, isobutyric acid, heptanoic acid, isooctanoic acid, 2-ethylhexanoic acid, nonanoic acid, isostearic acid, etc.). These acid components can be used singly or in combination of two or more kinds thereof.

The number average molecular weight of the ester compound to be used for the crystallization accelerator (C) may be 200 to 10,000, or 400 to 8,000. Further, the volatile loss at 300° C. of the ester compound may be 1% by mass or less, or the volatile loss at 300° C. of the ester compound is 0.6% or less. When the number average molecular weight is smaller than 200, the fogging resistance may be reduced in some cases, and if the number average molecular weight exceeds 10,000, sufficient crystallization may not be obtained in some cases.

Although the form of the organic crystallization accelerator used in the present invention is not particularly limited, in one or more embodiments it may be in the form of a liquid having a low viscosity of 3000 cps (25° C.) or less or a solid having a high melting point of 100° C. or more. In the case of a solid, a solid having a melting point of from 100 to 250° C. may be more preferable. If the melting point exceeds 250° C., the crystallization accelerator may not be sufficiently melt-mixed at the time of mixing with the thermoplastic resin (A). If the melting point is lower than 100° C., the crystallization accelerator melts on the hopper of the extruder, thereby to cause bridging which may deteriorate workability in some cases.

Specific examples of the ester compound include the ester compounds described in Japanese Patent No. 3642363, and these compounds may be preferably used.

(Optional Component)

From the viewpoint of improving moist heat aging resistance and fogging resistance, it may be preferable to further add an epoxy compound, a carbodiimide compound or an oxazoline compound as a compound having a molecular chain extending effect of the thermoplastic resin (A) and a sealing effect of the terminal functional group, to the thermally conductive resin composition.

The content of these compounds may be 0.01 to 5% by mass, or 0.1 to 4% by mass, or 0.2 to 3% by mass, with respect to 100% by mass of the entire thermally conductive resin composition. When the content is less than 0.01% by mass, there is a case where improvement in moist heat aging resistance is not sufficiently observed in some cases. When the content exceeds 5% by mass, such a content inhibits a promotion of crystallization and the effect of the present invention cannot be sufficiently exhibited in some cases.

The epoxy compound is not particularly limited as long as it has an epoxy group, and includes monofunctional, bifunctional, trifunctional or polyfunctional epoxy compounds. Among them, monofunctional epoxy compounds and bifunctional epoxy compounds may be preferred.

Specific examples of the epoxy compound include glycidyl ethers such as methyl glycidyl ether, butyl glycidyl ether, 2-ethylhexyl glycidyl ether, decyl glycidyl ether, stearyl glycidyl ether, phenyl glycidyl ether, butyl phenyl glycidyl ether, and allyl glycidyl ether, diglycidyl ethers such as neopentyl glycol diglycidyl ether, ethylene glycol diglycidyl ether, glycerol diglycidyl ether, propylene glycol diglycidyl ether, and bisphenol diglycidyl ether; fatty acid glycidyl esters such as glycidyl benzoate, and glycidyl sorbate; diglycidyl esters such as diglycidyl adipate, diglycidyl terephthalate, and diglycidyl orthophthalate; alicyclic diepoxy compounds such as 3,4-epoxycyclohexylmethyl-3,4-epoxycyclohexyl carboxylate; epoxy group-containing olefin copolymers; and the like.

The carbodiimide compound is a compound having two or more —N=C=N— structures in one molecule, and a known one prepared by decarboxylation of a diisocyanate compound can be used (see U.S. Pat. No. 2,941,956, JP-B-47-3279, J. Org. Chem., 28, 2069-2075 (1963), Chemical Review 1981, Vol. 81, No. 4, 619-621).

It is possible to use homopolymers or copolymers of one or two or more members selected from the diisocyanate compounds including 4,4-diphenylmethane diisocyanate, 4,4-diphenyldimethylmethane diisocyanate, 1,3-phenylene diisocyanate, 1,4-phenylene diisocyanate, 2,4-tolylene diisocyanate, 2,6-tolylene disocyanate, 1,5-naphthylene diisocyanate, hexamethylene diisocyanate, dicyclohexylmethane diisocyanate, cyclohexane-1,4-diisocyanate, xylylene diisocyanate, isophorone diisocyanate, methylcyclohexane diisocyanate, tetramethylxylylene diisocyanate, 1,3,5-triisopropylphenylene-2,4-diisocyanate, etc. Further, branched structures and functional groups other than carbodiimide groups and isocyanate groups may be introduced by copolymerization.

Further, it is also possible to control the degree of polymerization by blocking a part or all of the isocyanates at the terminal of the polymer. As a terminal blocking agent, a monoisocyanate compound such as phenyl isocyanate, trisisocyanate, dimethylphenyl isocyanate, cyclohexyl isocyanate, butyl isocyanate or naphthyl isocyanate, and a compound having —OH group, —COOH group, —SH group, —NH—R group (wherein R is a hydrogen atom or an alkyl group), etc. can be used.

Commercially available products of carbodiimide compounds include STABAXOL (registered trademark) series, manufactured by Rhein Chemie GmbH; CARBODILITE (registered trademark) series, manufactured by Nisshinbo Holdings Inc.; COSMONATE (registered trademark) LK and COSMONATE (registered trademark) LL, manufactured by Mitsui Takeda Chemical Inc.; LUPRANATE (registered trademark) MM-103, manufactured by BASF INOAC Polyurethane Ltd; and the like. Among them, it may be preferable to use a polycarbodiimide composed of an aliphatic or alicyclic structure. In the commercial products, a CARBODILITE series manufactured by Nisshinbo Holdings Inc. is composed of an aliphatic or alicyclic structure and may be preferably used.

The oxazoline compound is a compound having an oxazoline group in the molecule, and a polymer containing an oxazoline group may be particularly preferable. Examples of the commercially available oxazoline compound include an EPOCROS (registered trademark) series manufactured by Nippon Shokubai Co., Ltd.

Known fillers other than the inorganic filler (B) can be widely added to the thermally conductive resin composition. Examples of the filler other than the inorganic filler (B) include inorganic fibers (e, g. diatomaceous earth powder, basic magnesium silicate, baked clay, fine silica powder, quartz powder, crystalline silica, kaolin, antimony trioxide, fine mica powder, molybdenum disulfide, rock wool, ceramic fiber, asbestos, etc.) and glass fillers (e. g. glass fiber, glass powder, glass cloth, molten silica, etc.). By using these fillers, it is possible to improve the properties (such as the thermal conductivity, the mechanical strength, and the abrasion resistance, which may be preferable for utilizing the resin composition) of the resin composition. In addition, an organic filler may also be added to the thermally conductive resin composition. Examples of the organic filler include: synthetic fiber such as paper, pulp, wood, polyamide fiber, aramid fiber, and boron fiber; and resin powder such as polyolefin powder.

To increase the adhesive property of an interface between the resin and the filler and facilitate workability, the inorganic filler (B) and the filler other than the inorganic filler (B) may be subjected to a surface treatment using various surface treatment agents such as silane agent, stearic acid, and acrylic monomer. The surface treatment agent is not particularly limited, and conventionally known agents such as a silane coupling agent and a titanate coupling agent may be used. Among these, an epoxy group-containing silane coupling agent (such as epoxysilane), an amino group-containing silane coupling agent (such as aminosilane), and polyoxyethylene silane may be preferable since these substances hardly deteriorate the physical property of the resin. The surface treatment method of the filler is not particularly limited, and normal treatment methods may be utilized.

In one or more embodiments, the thermally conductive resin composition of the present invention may be alloyed with the thermoplastic resin (A) by blending at least one thermosetting resin. Specific examples of the thermosetting resin include an epoxy resin, a bismaleimide resin, a polyether resin, a phenol resin, a silicone resin, a fluorine resin, an acrylic resin, a melamine resin, a urea resin, an urethane resin, and the like.

In one or more embodiments, any components as an additive other than the above resin and filler, and other auxiliary agents may be added to the thermally conductive resin composition without deteriorating the effects of the present invention. Examples of such additive include at least one member selected from the group consisting of a reinforcing agent, a heat stabilizer, an antioxidant, an ultraviolet absorber, an anti-aging agent, a thickener, a release agent, a plasticizer, a coupling agent, a flame retardant, a flame retardant auxiliary, a flameproofing agent, an antibacterial agent, and a coloring agent. The amount of these additives and other auxiliary agents to be used may be in the range of from 0 to 20 parts by weight with respect to 100 parts by weight of the thermoplastic resin (A). Examples of the heat stabilizer include phosphites, hindered phenols, thioethers, and the like. These can be used singly or in combination of two or more kinds thereof.

Examples of the antioxidant include phosphites, hindered amines, hydroquinones, hindered phenols, and sulfur-containing compounds. These materials may be used singly or in combination of two or more kinds thereof.

Examples of the ultraviolet absorber include benzophenones, benzotriazoles, salicylic acid esters, and metal complex salts. These materials may be used singly or in combination of two or more kinds thereof.

Examples of the flame retardant include an organic flame retardant, an inorganic flame retardant, and a reactive flame retardant. These materials may be used singly or in combination of two or more kinds thereof.

Examples of the organic flame retardant include halogen-based flame retardants such as a brominated epoxy-based compound, a brominated alkyl triazine compound, a brominated bisphenol-based epoxy resin, a brominated bisphenol-based phenoxy resin, a brominated bisphenol-based polycarbonate resin, a brominated polystyrene resin, a brominated crosslinked polystyrene resin, a brominated bisphenol cyanurate resin, a brominated polyphenylene ether, a brominated bismaleimide, decabromodiphenyl oxide, tetrabromobisphenol A and its oligomer; phosphorus-based flame retardants including phosphates such as trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, cresyl diphenyl phosphate, dicresyl phenyl phosphate, dimethylethyl phosphate, methyl dibutyl phosphate, ethyl dipropyl phosphate, and hydroxyphenyl diphenyl phosphate, compounds obtained by modifying these phosphates with various substituents, various condensed phosphate compounds, and phosphazene derivatives containing a phosphorus element and a nitrogen element, and polytetrafluoroethylene. These materials may be used singly or in combination of two or more kinds thereof.

Examples of the inorganic flame retardant include aluminum hydroxide, antimony oxide, magnesium hydroxide, zinc borate, zirconium compound, molybdenum compound, zinc stannate, guanidine salt, silicone compound, and phosphazene compound. These may be used singly or in combination of two or more kinds thereof.

Examples of the reactive flame retardant include tetmbromobisphenol A, dibromophenol glycidyl ether, brominated aromatic triazine, tribromophenol, tetmbromophthalate, tetmchlorophthalic anhydride, dibromoneopentylglycol, poly(pentabromobenzil polyacylate), chlorendic acid (HET acid), chlorendic anhydride (HET anhydride), brominated phenol glycidyl ether, dibromocresyl glycidyl ether, and an organic phosphorous flame retardant represented by the general formula (3) below (in this formula, n is an integer of from 2 to 20). These may be used singly or in combination of two or more kinds thereof.

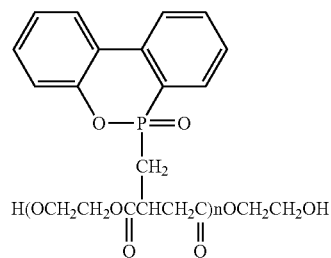

General Formula 3

In one or more embodiments, when adding the flame retardant to the thermally conductive resin composition, it may be preferable to add a flame retardant auxiliary. Examples of the flame retardant auxiliary include antimony compounds such as diantimony trioxide, diantimony tetroxide, diantimony pentoxide, sodium antimonate, and antimony tartrate; zinc borate; barium metaborate; hydrated alumina; zirconium oxide; ammonium polyphosphate; tin oxide; and iron oxide. These may be used singly or in combination of two or more kinds thereof. Further, silicone oil may be added to improve the flame retardancy.

Examples of the anti-aging agent include a naphthylamine compound, a diphenylamine compound, a p-phenylenediamine compound, a quinoline compound, a hydroquinone derivative compound, a monophenol compound, a bisphenol compound, a trisphenol compound, a polyphenol compound, a thiobisphenol compound, a hindered phenol compound, a phosphite compound, an imidazole compound, a dithiocarbamic acid nickel salt compound, and a phosphate compound. These may be used singly or in combination of two or more kinds thereof.

Examples of the plasticizer include phthalic esters such as dimethyl phthalate, diethyl phthalate, dibutyl phthalate, diisobutyl phthalate, dioctyl phthalate, butyl octyl phthalate, di-(2-ethylhexyl) phthalate, diisooctyl phthalate, and diisodecyl phthalate; fatty acid esters such as dimethyl adipate, diisobutyl adipate, di-(2-ethylhexyl) adipate, diisooctyl adipate, diisodecyl adipate, octyl decyl adipate, di-(2-ethylhexyl) azelate, diisooctyl azelate, diisobutyl azelate, dibutyl sebacate, di-(2-ethylhexyl) sebacate, and diisooctyl sebacate; trimellitic acid esters such as isodecyl trimellitate, octyl trimellitate, n-octyl trimellitate, and isononyl trimellitate; di-(2-ethylhexyl) fumarate; diethylene glycol monooleate; glyceryl monoricinoleate; trilauryl phosphate; tristearyl phosphate; tri-(2-ethylhexyl) phosphate; epoxidized soybean oil; and polyether ester. These may be used singly or in combination of two or more kinds thereof.

Examples of the antibacterial agent include inorganic antibacterial agents such as a zeolite antibacterial agent (e.g. silver zeolite, silver-zinc zeolite, etc.), a silica gel antibacterial agent (e.g. silver complex-silica gel, etc.), a glass antibacterial agent, a calcium phosphate antibacterial agent, a zirconium phosphate antibacterial agent, a silicate antibacterial agent (e.g. silver-aluminosilicate magnesium, etc.), a titanium oxide antibacterial agent, a ceramic antibacterial agent, and a whisker antibacterial agent; organic antibacterial agents such as a formaldehyde releasing agent, a halogenated aromatic compound, an iodopropargyl derivative, a thiocyanate compound, an isothiazolinone derivative, a trihalomethylthio compound, a quaternary ammonium salt, a biguanide compound, aldehydes, phenols, pyridine oxide, carbanilide, diphenyl ether, carboxylic acid, and an organometallic compound; an inorganic-organic hybrid antibacterial agent; and a natural antibacterial agent. These may be used singly or in combination of two or more kinds thereof.

Examples of the coloring agent include an organic dye, an inorganic pigment, and an organic pigment. These may be used singly or in combination of two or more kinds thereof.

(Physical Properties of Thermally Conductive Resin Composition)

In one or more embodiments, the specific gravity of the thermally conductive resin composition is usually 1.4 to 2.0, or 1.5 to 1.9. By having a specific gravity in such a range, the thermally conductive resin composition can be suitably used as a substitute for metals, and can give a lightweight molded article.

In the present invention, the "In-Plane thermal conductivity" means the thermal conductivity in a direction to which the molten resin flows at the time of producing the molded article. Further, the thermal conductivity in a direction vertical to the direction in which the resin flows is referred to as the "Thru-Plane thermal conductivity".

In one or more embodiments, the In-Plane thermal conductivity of the thermally conductive resin composition of the present invention is 1 W/(m·K) or higher, or 3 W/(m·K) or higher, or 5 W/(m·K) or higher, or 8 W/(m·K) or higher, or 10 W/(m·K) or higher, or 15 W/(m·K) or higher. By having the In-Plane thermal conductivity within such a range, the thermally conductive resin composition can be suitably used as a substitute for metals, and can give a molded article having an excellent thermal conductivity. In one or more embodiments, the upper limit of the In-Plane thermal conductivity of the thermally conductive resin composition of the present invention is not particularly limited. In one or more embodiments, the upper limit is typically 100 W/(m·K) or less.

In one or more embodiments, the Thru-Plane thermal conductivity of the thermally conductive resin composition of the present invention (Thru-Plane thermal conductivity) is not particularly limited. The higher the Thru-Plane thermal conductivity of the thermally conductive resin composition of the present invention is better. The thermal conductivity may be 0.5 W/(m·K) or higher, or 0.8 W/(m·K) or higher, or 1 W/(m·K) or higher.

In one or more embodiments, the thermally conductive resin composition of the present invention is excellent in heat resistance, and a load deflection temperature (HDT) under a load of 1.82 MPa may be 120° C. or more, or 130° C. or more, or 150° C. or more. As the heating value of the heating element increases, the temperature of the heating element tends to rise, and HDT may be 120° C. or more.

In one or more embodiments, the thermally conductive resin composition of the present invention is excellent in long-term heat resistance. In some cases, the thermally conductive resin composition is used at a high temperature for a long period of time. Therefore, the higher the long-term heat resistance is better. The long-term heat resistance herein denotes a retention rate of bending strength of the thermally conductive resin composition after it is left in the atmosphere at 150° C. for 2,000 hours (i.e., bending strength after being left for 2,000 hours/initial bending strength). The retention rate of bending strength may be 60% or more, more or 70% or more, or 75% or more.

In one or more embodiments, the thermally conductive resin composition of the present invention is excellent in emissivity. The emissivity is obtained by measuring the emissivity of the molded article with use of an emissivity measuring device and may be 0.65 or more, or 0.7 or more, or 0.75 or more.

In one or more embodiments, the thermally conductive resin composition of the present invention is also excellent in electromagnetic wave shielding property, and shows an electromagnetic wave shielding effect of 5 dB or more, or 10 dB or more, or 15 to 60 dB, at a frequency of 100 MHz.

(Application)

Since the thermally conductive resin composition of one or more embodiments of the present invention is excellent in thermal conductivity and molding processability and has a low specific gravity, the molded article made of the composition is suitable for a structural member for heat dissipation. Specific examples of the heat dissipating structural member include, for example, a heat dissipation casing, a heat dissipation chassis, and the like.

In the heat dissipation casing of one or more embodiments of the present invention, a heating element is housed therein and used. As the heating element, it may be a substance which is exothermic per se, or it may be a substance which is heated from the outside and generates heat. A representative heating element is a heat-generating component or device (equipment), for example, an electronic component such as an LD (laser diode), an IC (integrated circuit), an electronic device using a computer such as a personal computer, a word processor, and a video gamer, an engine control unit (ECU) which is a computer for determining the fuel injection amount and ignition timing based on information such as the amount of air taken into the engine of the automobile and the throttle opening degree, an LED lamp lighting, an inverter, a housing for automobile lamp, a coil, a bobbin, a connector, a bus bar, a power steering, an in-vehicle CCD camera, and the like.

Further, the heat dissipation chassis of one or more embodiments of the present invention is used as a key chassis or a sub chassis to dissipate heat from a heating element Representatively, as the heating element, heat generating parts which are themselves heating elements, examples of which are electronic component s such as LD and IC in electronic and electric products such as mobile phones and TVs. Besides use by being mounted (fixed) on the heat dissipation chassis, these are not fixed to the heat dissipation chassis but are placed in contact with or close to the heat dissipation chassis. In addition, the heat dissipation chassis of one or more embodiments of the present invention is suitably used also as an LED (light emitting diode) lighting package.

The molded article made of the thermally conductive resin composition of one or more embodiments of the present invention is also suitable for an automotive LED lamp heat sink, can be freely designed in shape as compared with a metal, and can improve fuel economy by reducing the weight. The automotive LED lamp heat sink of one or more embodiments of the present invention refers to a heat sink for cooling the LED module.

The automotive LED lamps are roughly divided into interior lamps and exterior lamps. Examples of the interior lamps include a room lamp and a map lamp. Examples of the exterior lamps include a rear lamp, a front lamp, and a head lamp. Specific examples of the rear lamp include a tail lamp, a stop lamp, a rear turn signal lamp, a rear fog lamp, a high mounted stop lamp, a back lamp, and a number plate lamp. Specific examples of the front lamp include a front fog lamp, a front turn signal lamp, a front positioning lamp, a side turn signal lamp, a day lamp, and a fashion lamp. Among these automotive LED lamps, a high luminance LED module is used, and from the viewpoint of a demand for heat dissipation, a rear lamp, a front lamp, and a head lamp are suitable for use, and a tail lamp, a stop lamp, a fog lamp, a positioning lamp, a turn signal lamp, a day lamp, and a head lamp may be preferably used.

Power consumption of each LED in the automotive LED lamp varies depending on its use. Further, a plurality of LED modules may be used. Each of the rear lamp and the front lamp uses an LED module of typically 0.1 to 15 W, 0.1 to 10 W, or 0.1.1 to W, or 0.1 to 5 W, or 0.1 to 3 W. Further, the head lamp uses an LED module of generally 1 W or higher, 5 to 40 W, or 10 to 30 W, or 10 to 25 W, or 10 to 20 W.

The entire surface or the entire inside of heat dissipation casing, heat dissipation chassis, and automotive LED lamp heat sink, which are structural members for heat dissipation in one or more embodiments of the present invention, may be composed of the thermally conductive resin composition of one or more embodiments of the present invention or may be composed of other materials partially depending on the intended use. Further, holes may be provided on arbitrary surfaces. Specifically, in order to impart insulating properties, an insulating member made of a ceramic or an insulating resin or an insulating resin composition is combined with a molded article composed of the thermally conductive resin composition of one or more embodiments of the present invention. Alternatively, a good heat conductor such as a metal or a carbon material may be combined with the molded article of one or more embodiments of the present invention so that the heat dissipation property is enhanced.

There is no particular limitation on the location of the good heat conductor, but after dissipating the heat of the heating element with a good heat conductor, heat dissipation by the molded article of one or more embodiments of the present invention can efficiently dissipate heat, so that it may be preferable to install the good heat conductor between the heating element and the molded article of one or more embodiments of the present invention.

In the case of a method of combining the molded article of one or more embodiments of the present invention with the good heat conductor, voids may be generated between the molded article and the good heat conductor depending on the combining method. The voids between the good heat conductor and the molded article become a heat resistance, and the heat transfer efficiency decreases. In order to improve the heat dissipation property, it may be preferable to install a material that fills or closely adheres the voids. Although the material filling the void is not particularly limited, it may be more preferable to use a heat dissipation material that reduces the heat resistance like TIM (thermal interface material) and has thermal conductivity. The TIM is not particularly limited, and the thermal conductivity is also not limited, but the TIM having a thermal conductivity of 0.5 W/(m·K) or more may be preferable from the viewpoint of heat dissipation property.

The material of the metal constituting the good heat conductor is not particularly limited. Examples of the good conductor metal include aluminum, alloy containing aluminum (aluminum alloy), copper, alloy containing copper (brass, bronze, aluminum brass, etc.), nickel, chromium, titanium, iron, cobalt, tin, zinc, palladium, silver, stainless steel, magnesium, alloy containing magnesium (magnesium alloy), and manganese. Among these metals, aluminum, copper, magnesium, and alloys of these may be preferable from the viewpoint that each of aluminum, copper, magnesium, and alloys of these has thermal conductivity of 40 W/(m·K) or more and is easily available.

Examples of the good heat conductor composed of a carbon material include a graphite sheet and a carbon fiber composite material. The graphite sheet may be preferable since it has a high thermal conductivity. The In-Plane thermal conductivity of the graphite sheet is not particularly limited. The higher the In-Plane thermal conductivity of the graphite sheet is better. The In-Plane thermal conductivity of the graphite sheet may be 500 W/(m·K) or more, or 1,000 W/(m·K) or more, or 1,300 W/(m·K) or more.

The thickness of the member made of the good heat conductor is not particularly limited but may be 5 mm or less, or 3 mm or less, or 1 mm or less. When the good heat conductor is a graphite sheet, the thickness may be 500 μm or less, or 200 μm or less, or 100 μm or less. The smaller the thickness is, the more preferable it may be because weight reduction can be realized.

The shape of the good heat conductor is not particularly limited, but includes a flat plate shape, a curved plate shape, a rod shape, a tubular shape, a block shape, and the like, or may be a structure composed of a combination of these. Further, the shape may have a through hole, a bent portion, or the like.

The surface shape of the good heat conductor is not particularly limited, but includes a flat plate, a curved surface, an uneven surface, a pointed portion, and the like.

The surface of the member made of the good conductor metal (hereinafter also referred to as a metal member) may be subjected to a surface treatment from the viewpoint of adhesive strength between this metal member and the molded article of one or more embodiments of the present invention and adhesion therebetween. The surface treatment method is not particularly limited, but includes, for example, fine roughening by a special chemical liquid or physical polishing; formation of a film by anodic oxidation or an organic compound; and primer coat by an adhesive or the like. Examples of a metal surface treatment include metal surface treatment technologies described in Japanese Patent Nos. 4270446, 4527196, and 5302315.

Examples of a method of joining and fixing the metal member and the molded article of one or more embodiments of the present invention include insert molding, adhesive, vibration welding, ultrasonic welding, and heat fusion. Among these joining methods, the insert molding, the ultrasonic welding, the heat fusion, and the vibration welding may be preferable from the viewpoint of stable productivity and low production cost.

The vibration frequency when performing the vibration welding may be about 100 to 300 Hz, and the vibration frequency when performing the ultrasonic welding may be 10 to 50 kHz. Further a total number of vibrations in the vibration welding may be 300 to 10,000, and the total number of vibrations in the ultrasound welding may be 10,000 to 150,000.

For the purpose of impart insulating properties, one or more embodiments of the molded article of the present invention may be combined with an insulating member made of ceramics, insulating resin or insulating resin composition. A resin or resin composition having insulating properties may be preferable from the viewpoint that insulating properties can be imparted at low cost Although the combining method is not particularly limited, such a method includes a method using integral molding such as insert molding or two-color molding, and a method of separately producing only an insulating member and combining the insulating member with one or more embodiments of the molded article of the present invention by an adhesive, vibration welding, ultrasonic welding, heat fusion or the like.

FIGS. 1 to 5 show one embodiment of the heat dissipating structural member of the present invention and do not limit the heat dissipating structural member of the present invention. The dimension of the heat dissipating structural member of one or more embodiments of the present invention is not particularly limited, and is appropriately selected according to the use of the structural member, the type of the heating element housed in the structural member, the heat dissipation behavior, and the like. From the viewpoint of further enhancing the heat dissipation property, the molded article of one or more embodiments of the present invention can be combined with a metal member.

Figure 1B:
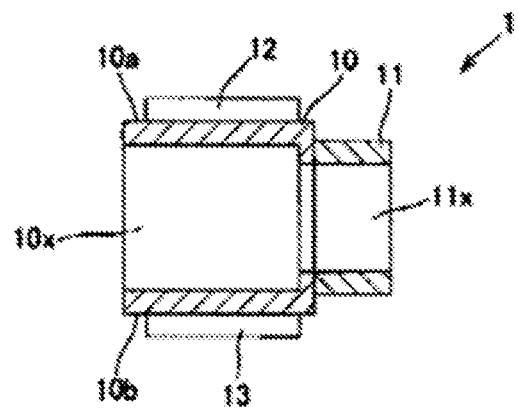

FIG. 1 is a schematic diagram showing a configuration of one embodiment of a heat dissipation casing 1 for housing an in-vehicle CCD camera, wherein (a) is a perspective view, and (b) is a cross-sectional view taken along the cut line X-X in (a). The heat dissipation casing 1 is a molded article composed of the thermally conductive resin composition of one or more embodiments of the present invention and includes a first cylindrical body 10 having a substantially rectangular shape in a cross sectional view extending in the lateral direction, a second cylindrical body 11 which is integrated so as to extend coaxially with the first cylindrical body 10 and has a smaller diameter than the first cylindrical body 10, and a plurality of first and second heat dissipation fins 12 and 13 projecting from one and the other of the upper and lower surfaces 10a and 10b of the first cylindrical body 10, and extending separately from each other in the same direction as the first cylindrical body 10. An in-vehicle CCD camera is housed in the internal space 10x of the first cylindrical body 10, and the CCD camera is electrically connected via the internal space 11x of the second cylindrical body 11. The sectional shapes of the first and second cylindrical bodies 10 and 11 are not limited to rectangular shapes but may be any shape such as a circle or a polygon depending on the shape or the like of the heating element housed in the inner space 10x of the first cylindrical body 10. Although the number of each of the first and second heat dissipation fins 12 and 13 in the present embodiment is four, the number is not limited thereto, and any number of them can be taken.

Figure 2A:
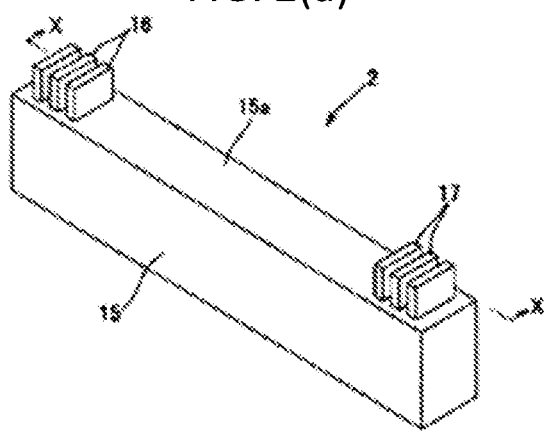
FIGS. 2(a) and 2(b) are schematic diagrams showing a configuration of one embodiment of a box-shaped heat dissipation casing.
Figure 2B:
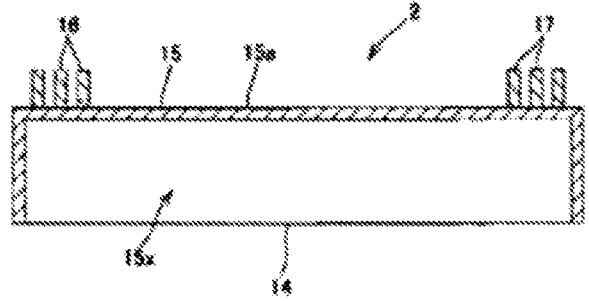

FIG. 2 is a schematic diagram showing a configuration of one embodiment of a box-shaped heat dissipation casing 2, wherein (a) is a perspective view of the box-shaped heat dissipation casing in a state in which an opening 14 faces downward and (b) is a cross-sectional view taken along the cut line X-X in (a). The heat dissipation casing 2 is a molded article composed of the thermally conductive resin composition of one or more embodiments of the present invention, and includes a substantially rectangular parallelepiped main body 15 having the opening 14 on one side thereof, and heat dissipation fins 16 and 17 provided upright in the vicinity of both longitudinal end portions of an outer surface 15a opposed to the opening 14 of the main body 15 and extending separately from each other in the width direction of the main body 15. The box-shaped heat dissipation casing 2 is used to store, for example, a DRL (daytime running lamp) for an automobile LED lamp. A heating element is stored in an internal space 15x of the main body 15. When it is necessary to electrically connect the heating element, for example, a through hole (not shown) from the surface 15a to the internal space 15x is appropriately formed. This is common to heat dissipation structural members of one or more embodiments of the present invention.

Figure 3A:
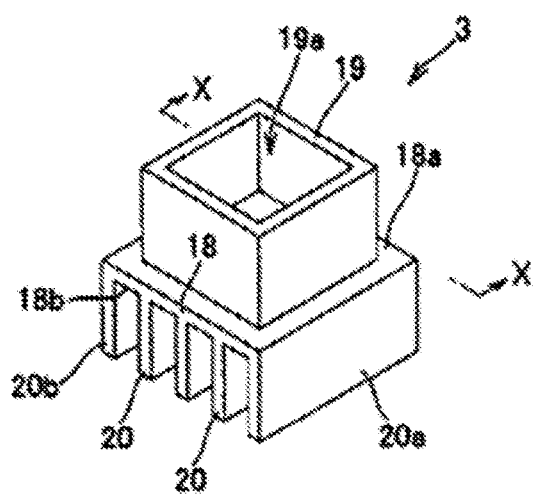
FIGS. 3(a) and 3(b) are schematic diagrams showing a configuration of one embodiment of a heat sink for housing an in-vehicle LED lamp.
Figure 3B:
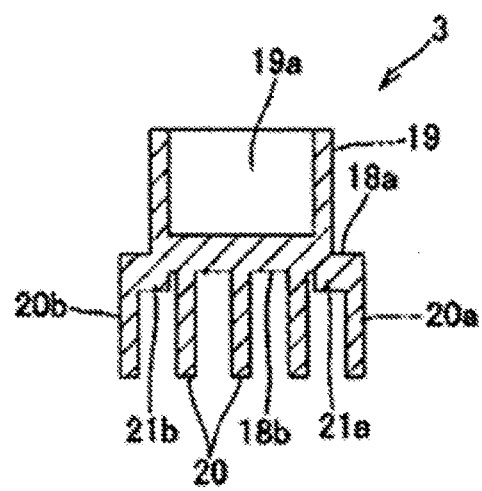

FIG. 3 is a schematic diagram showing a configuration of one embodiment of a heat sink 3 for storing an in-vehicle LED lamp, wherein (a) is a perspective view, and (b) is a cross-sectional view taken along the cut line X-X in (a). The heat sink 3 is a molded article composed of the thermally conductive resin composition of one or more embodiments of the present invention and includes a support plate 18, a frame body 19 provided upright from one surface 18a of the support plate 18 and having a substantially rectangular cross section, and a plurality of dissipation fins 20 provided so as to hang substantially in parallel separately from each other from the other surface 18b of the support plate 18. The joint portion between heat dissipation fins 20a and 20b at one end and the other end and the support plate 18 has ribs 21a and 21b which are substantially rectangular in cross section and protrude from the heat dissipation fins 20a and 20b toward the adjacent dissipation fins 20 to improve the bonding strength and the heat dissipation speed. In an internal space 19a formed by the support plate 18 and the frame body 19, a heating element such as an in-vehicle LED lamp or the like is housed.

Figure 4A:
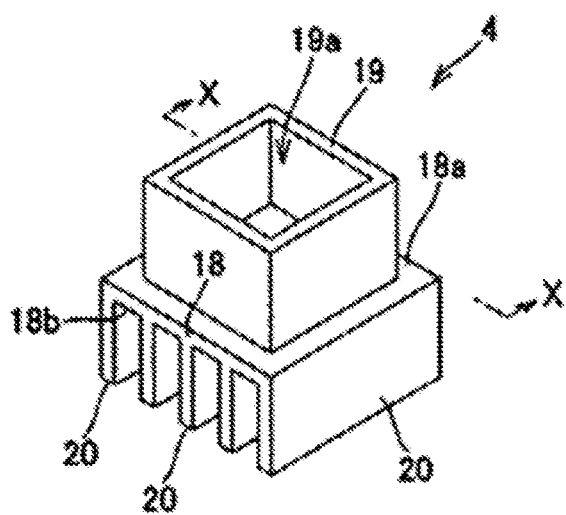
FIGS. 4(a) and 4(b) are schematic diagrams showing a configuration of another embodiment of a heat sink for housing an in-vehicle LED lamp.
Figure 4B:
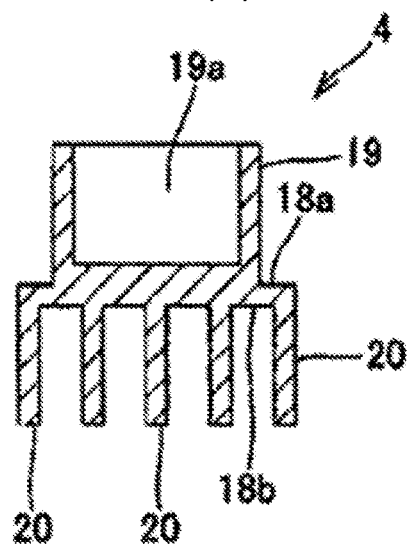

FIG. 4 is a schematic diagram showing a configuration of a heat sink 4 for housing an in-vehicle LED lamp according to another embodiment, wherein (a) is a perspective view, and (b) is a cross-sectional view taken along the cut line X-X in (a). The heat sink 4 has the same configuration as the heat sink 3 except that the heat sink 4 does not have the ribs 21a and 21b.

Figure 5A:
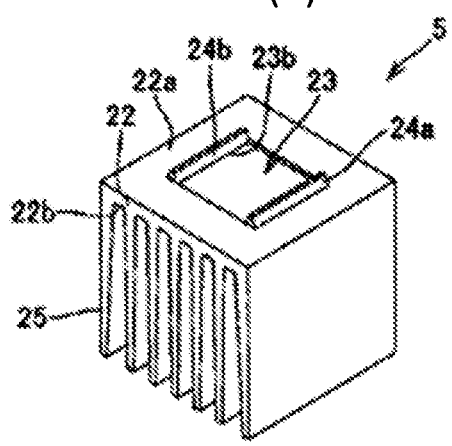
FIGS. 5(a), 5(b), and 5(c) are schematic diagrams showing a configuration of a heat sink according to another embodiment.
Figure 5B:
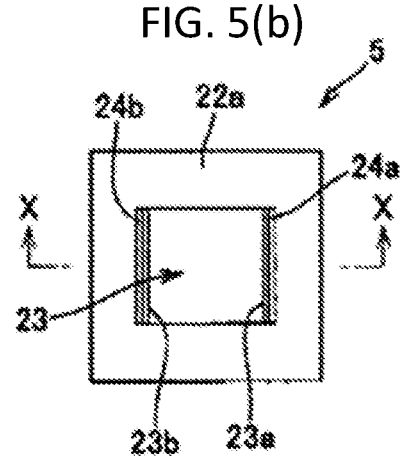
Figure 5C:
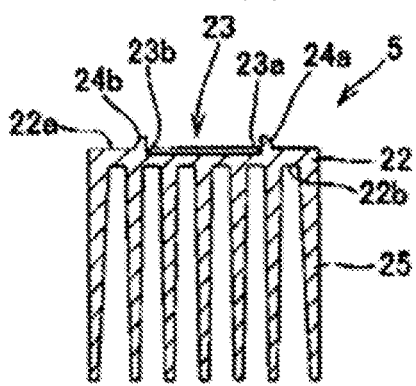

FIG. 5 is a schematic diagram showing a configuration of a heat sink 5 according to another embodiment, wherein (a) is a perspective view, (b) is a top view, and (c) is a cross-sectional view taken along the cut line X-X. The heat sink 5 has a feature that it can be easily combined with, for example, a metal member. The heat sink 5 is a molded article composed of the thermally conductive resin composition of one or more embodiments of the present invention and includes: a substantially rectangular support plate 22; a substantially rectangular recessed part 23 which is provided on one surface 22a of the support plate 22 and in which a heating element, a metallic member, or a composite of the heating element and the metallic member (both not shown) is housed; protrusions 24a and 24b which are provided upright from both ends 23a and 23b in one direction of the recessed part 23 and fix a heating element, a metallic member, or a composite of the heating element and the metallic member to the recessed part 23; and a plurality of plate-like heat dissipation fins 25 which are vertically suspended separately from each other from the other surface 22b of the support plate 22 and gradually become thinner toward the distal end side. For example, after placing the heating element, the metal member, or the composite in the recessed part 23, the both side edges 23a and 23b of the recessed part 23 are thermally caulked by heat, ultrasonic wave, vibration, etc., so that the heating element, the metal member, or the composite can be fixed to the recessed part 23 and then installed. Further, by providing a heat dissipation material for reducing the heat resistance such as TIM between the heating element, the metal member, or the composite and the recessed part 23, the heat dissipation property can be further improved. By providing the dissipation fins 25, it is possible to dissipate the heat generated from the heating element with extremely high efficiency in combination with the high thermal conductivity of the thermally conductive resin composition of one or more embodiments of the present invention. The overall three-dimensional shape of the heat sink 5 of this embodiment is a quadrangular prism shape, but is not limited thereto, and it may be any shape such as a sphere, a polygonal prism other than a quadrangular prism, a cylinder, an elliptic cylinder, etc., depending on the application of the heat sink. Further, the planar shape of the recessed part 23 is not particularly limited, and it may be circular, elliptical, polygonal other than square, or the like. In addition, the number of dissipation fins 25 is also not limited.

Figure 6A:
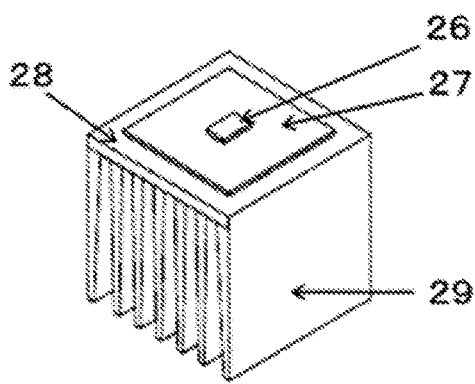
FIGS. 6(a) and 6(b) are schematic diagrams showing a configuration of one embodiment of an automotive LED lamp heat sink.
Figure 6B:
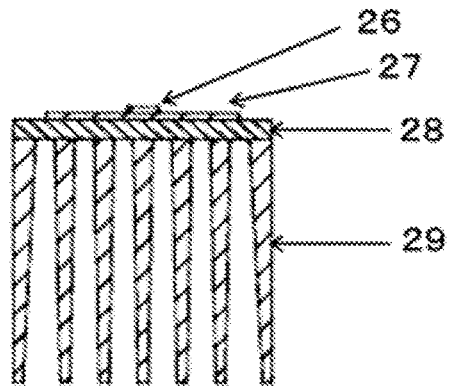

The shape of the automotive LED lamp heat sink of one or more embodiments of the present invention is not particularly limited, and a representative configuration is shown in FIG. 6, wherein (a) is a perspective view and (b) is a cross-sectional view. The heat sink of the present embodiment is composed of a heat sink base 28 and heat sink fins 29, and a circuit board 27 and an LED module 26 are arranged on the upper surface of the heat sink base 28. The heat sink fins 29 are composed of a plurality of flat plate members arranged in parallel to each other, each of which extends in the vertical direction from the lower surface of the heat sink base 28. In this heat sink, by increasing the Thru-Plane thermal conductivity of the base portion of the heat sink, the heat of the LED module which is a heating element can be efficiently transferred to the fin portion, so that the heat dissipation performance can be improved.

In manufacturing a heat sink, it is necessary to cause a resin to flow into the mold cavity from a narrow gate (inflow port) with respect to the thickness of the heat sink, that is, a thickness ratio of the heat sink to the thickness of a gate mark formed on the heat sink (ratio of heat sink thickness/gate mark thickness) is designed to be 2 or more, or 3 or more, or 5 or more. When the ratio of the heat sink thickness/the gate mark thickness is 2 or more, an inorganic filler (B) can be oriented in the thickness direction of the molded article, so that the Thru-Plane thermal conductivity of the heat sink is more efficiently increased. This product design is not limited to the shape of the heat sink and can be applied to all shapes regardless of the presence or absence of fins. Here, the gate mark thickness also includes the diameter of the gate mark. Further, the thickness of the heat sink indicates a thickness other than that of the fin portion, and is not particularly limited, but may be the thickness of the base portion of the heat sink.

The type of the gate is not particularly limited, but includes, for example, a direct gate, a side gate, a pinpoint gate, a film gate, a disc gate, a ring gate, a fan gate, a tab gate, a submarine gate, and a hot runner gate. The pinpoint gate and the film gate may be preferable from the viewpoint that the inorganic filler (B) is more easily oriented in the thickness direction of the heat sink.

The position of the gate mark to be provided is not particularly limited, but from the viewpoint of the heat dissipation property and moldability, it may be preferable that the gate mark be provided at a portion other than the fin portion.

The number of gate marks is not particularly limited, but from the viewpoint of the heat dissipation property and moldability, the number of gate marks may be 2 or more. When the number of gate marks is 2 or more, the Thru-Plane thermal conductivity of the weld portion, generated when filling the resin, can be increased and the heat of the LED module can be efficiently transmitted to the fins. When providing 2 or more gate marks, it may be preferable that the gate marks be provided symmetrically as much as possible relative to the heat sink from the viewpoint of the moldability.

The size of the automotive LED lamp heat sink is not particularly limited. Depending on the type of a lamp to be used, the power consumption of the LED varies, and therefore, the necessary size of the heat sink for heat dissipation varies. The length of a longest side of the heat sink for the rear lamp is 100 mm or less, or 70 mm or less, or 50 mm or less, or 40 mm or less. The length of a longest side of the heat sink for the front lamp is 200 mm or less, or 120 mm or less, or 80 mm or less, or 50 mm or less. The length of a longest side of the heat sink for the head lamp is 300 mm or less, or 200 mm or less, or 100 mm or less, or 80 mm or less.

The thickness of the heat sink base is not limited, and may be 10 mm or less, or 5 mm or less, or 3 mm or less, or 2 mm or less. If the thickness of the heat sink base exceeds 10 mm, heat of the LED module may not be efficiently transferred to the fins of the heat sink in some cases.

The height of the fin part of the heat sink is not particularly limited, and may be as high as possible from the viewpoint of being capable of enhancing heat dissipation. In this case, an In-Plane thermal conductivity of the fin part may be higher as much as possible than the In-Plane thermal conductivity of the base. In order to achieve the higher In-Plane thermal conductivity of the fin part, a ratio of the thickness of the fin part of the heat sink with respect to the thickness of the heat sink base may be 1 or less. If the thickness of the fins is not uniform, the thickness at the root of the fin is adopted to calculate the thickness ratio.

(Production Method)

A method of producing the thermally conductive resin composition of one or more embodiments of the present invention is not particularly limited. For example, the thermally conductive resin composition may be produced in such a manner that after drying the above components, additives, and the like, melt-kneading is performed by a melt kneader such as a single-screw extruder or a twin-screw extruder. A kneading temperature is selected based on the type of the thermoplastic resin (A). Further, if a component added is a liquid, it may be added to the melt kneader by a liquid supply pump or the like in the middle of the production. The method of molding the thermally conductive resin composition of one or more embodiments of the present invention is not particularly limited, and examples thereof include injection molding, extrusion molding (sheet extrusion, profile extrusion), two-color molding, blow molding, compression molding, vacuum molding, foam molding, blow molding, transfer molding, and the like. From the viewpoint of easy molding, the injection molding, extrusion molding, and transfer molding may be preferable.

EXAMPLES

Next, the present invention will be explained in more detail using production examples, examples, and comparative examples. However, the present invention is not limited to these examples.

Raw material components for use in preparing the resin composition are shown below.

Thermoplastic Resin (A):

Polyethylene terephthalate (A-1): NOVAPEX (trademark) PBK II (trade name), manufactured by Mitsubishi Chemical Corporation and having a number average molecular weight of 28,000

Polyester-polyether copolymer (A-2): As the polyester-polyether copolymer, a copolymer produced by the following method was used. That is, a reactor equipped with an agitator and a gas discharge outlet was charged with 70 parts by weight of polyethylene terephthalate (PET) (where IV=0.65) produced with an antimony-based catalyst and having an antimony metal concentration of 200 ppm by weight, 160 ppm of antimony trioxide with respect to the total amount of PET and polyether, 0.2 parts by weight of an antioxidant (Irganox (trademark) 1010 manufactured by Chiba Specialty Chemicals Inc.), and 30 parts by weight of polyether that is Bisol 18EN described later, and then was held at 270° C. for 2 hours, was subjected to reduced pressure with a vacuum pump, and held for 3 hours at one torr, and thereafter, the resulting product was taken out, thereby obtaining a polyester-polyether copolymer. The obtained polyester-polyether copolymer had a number average molecular weight of 25,400. The Bisol 18EN has a number average of (m+n) of 18 in the structure of the general formula (2).

Polybutylene terephthalate (A-3): 5008 L (trade name), manufactured by Mitsubishi Engineering-Plastics Corporation and having a number average molecular weight of 19,000

Inorganic Filler (B):

(B-1): Flacked graphite, CPB-80 (trade name), manufactured by Chuetsu Graphite Works Co., Ltd. and having a thermal conductivity of 200 W/(m·K), a volume average particle diameter of 300 µm, a fixed carbon content of 99.9% by mass, and an aspect ratio of 100

(B-2): Flacked graphite, BF-40AK (trade name), manufactured by Chuetsu Graphite Works Co., Ltd. and having a thermal conductivity of 200 W/(m·K), a volume average particle diameter of 50 µm, a fixed carbon content of 99.9% by mass, and an aspect ratio of 30

(B-3): Talc, Talc MS-KY (trade name), manufactured by Nippon Talc Co., Ltd. and having a thermal conductivity of 4 W/(m·K)

(B-4): Magnesium oxide, RF-50-SC (trade name), manufactured by Ube Materials Industries, Ltd. and having a thermal conductivity of 40 W/(m·K)

Crystallization Accelerator (C):

(C-1): Polyester oligomer, Polycizer A-55, manufactured by Dainippon Ink & Chemicals, Inc. and having a number average molecular weight of 3,000

(C-2): Polyethylene glycol dibenzoate, EB-400, manufactured by Sanyo Chemical Industries, Ltd.

(C-3): Organic nitrogen compound, ADK STAB NA-05 (trade name), manufactured by ADEKA Corporation Additive (D):

(D-1): Carbodiimide compound, CARBODILITE (trademark) LA-1 (trade name), manufactured by Nisshinbo Holdings Inc.

(D-2): Epoxy compound, ADK STAB (trademark) EP-13 (trade name), manufactured by ADEKA Corporation.

(D-3): Epoxy compound, BONDFAST (trademark) E (product name), manufactured by Sumitomo Chemical Co., Ltd.

Reinforcing Agent (E):

Glass fibers: T187H/PL (trade name), manufactured by Nippon Electric Glass Co., Ltd. and having a thermal conductivity of 1.0 W/(m·K) when measured alone, a fiber diameter of 13 µm, and a number average fiber length of 3.0 mm Flame Retardant (F):

Bromine-based flame retardant SAYTEX 7010P (trade name), manufactured by Albemarle Corp.

Flame Retardant Auxiliary (G):

Antimony trioxide PATOX-P (trade name), manufactured by Nippon Seiko Co., Ltd.

[Evaluation Method]

Number average molecular weight: A sample was prepared by dissolving the employed thermoplastic resin (A) at a concentration of 0.25% by weight in a mixed solvent of p-chlorophenol (manufactured by Tokyo Chemical Industry Co., Ltd.) and toluene in a volume ratio of 3:8. Using polystyrene as a standard substance, a similar sample solution was prepared. The number average molecular weight of the sample was measured under a high-temperature GPC (350 HT-GPC System manufactured by Viscotek) under the conditions of a column temperature of 80° C. and a flow rate of 1.00 mL/min. A differential refractometer (RI) was used as a detector.

Extrusion and kneading temperature: The thermally conductive resin composition was produced by an extrusion and melt-kneading process. The extrusion and kneading temperature in this process varies among the thermoplastic resins (A), and an extrusion and kneading process was performed at an extrusion barrel temperature shown in Table 1.

Molding process conditions: The temperature for producing a molded article by the molding process for use in evaluation differs among the thermoplastic resins (A) to be used, and the cylinder temperature and the mold temperature shown in Table 1 were set to carry out injection molding, thereby to obtain a molded article. The injection molding was carried out with a fixed injection speed of 150 mm/s and a fixed injection pressure of 150 MPa.

Volume average particle diameter of graphite: The volume average particle diameter of the graphite was measured by a Microtrac particle size distribution measuring device (MICROTRAC MT3300EXII produced by Nikkiso Co., Ltd.) in such a manner that graphite particles were input to a water solvent, and the mixture was then subjected to ultrasonic vibration for 60 seconds. Regarding the volume average particle diameter of the graphite particles after the molding process, a molded article of 26 mm in diameter and 1 mm in thickness produced by injection molding was burned at 620° C. for 1 hour and then only graphite particles contained in the molded article were taken out to measure the volume average particle diameter.

Aspect ratio of graphite: The aspect ratio of the graphite was calculated using an average value of longest diameters of 100 graphite particles and an average value of shortest diameters of 100 graphite particles by a scanning electron microscope (SEM) (JSM-6060LA manufactured by JEOL Ltd.). The aspect ratio of the graphite particle after the molding was calculated by the same method as above using a molded article having a diameter of 26 mm and a thickness of 1 mm.

Thermal conductivity: A molded article having a diameter of 26 mm and a thickness of 1 mm was produced by an injection molding machine (Si-15IV manufactured by Toyo Machinery & Metal Co., Ltd.) using pellets of the obtained thermally conductive resin composition. Then, the In-Plane thermal conductivity and the Thru-Plane thermal conductivity were measured in the atmosphere at room temperature according to ASTM E1461 by a laser flash method with a thermal conductivity measuring device (LFA447 manufactured by NETZSCH Co., Ltd.).

Specific gravity: The specific gravity was measured by an underwater substitution method using a molded article having a diameter of 26 mm and a thickness of 1 mm according to the ISO 1183 standard.

Crystallinity: A sample having a diameter of 26 mm and a thickness of 1 mm produced by injection molding was heated from 25° C. to 300° C. at a rate of 10° C./min under a nitrogen atmosphere using a differential scanning calorimeter (DSC 7020 manufactured by SII Nano Technology Inc.). The crystallinity of the thermoplastic resin (A) was determined from the exothermic peak value of the thermogram curve obtained at the time of temperature rise.

Molding processability: Using the pellets of the obtained thermally conductive resin composition, the resin was filled into a spiral tube (mold) of 10 mm width×1 mm thickness (pitch 5 mm) at an injection pressure of 150 MPa and an injection speed of 150 mm/s from the center of the spiral tube with an injection molding machine [Si-30 IV, manufactured by Toyo Machinery & Metal Co., Ltd.] wherein the cylinder temperature and the molding temperature were set to those shown in Table 1 according to the type of thermoplastic resin. At that time, the flow length of the molten resin was measured, and the molding processability was judged as follows. ○: flow length is 120 mm or more, Δ: flow length is 80 to 120 mm, x: flow length is less than 80 mm.

Heat resistance, HDT (high load): A specimen with a size of 80 mm×40 mm and a thickness of 4 mm was prepared with an injection molding machine (Si-30IV manufactured by Toyo Machinery & Metal Co., Ltd.), and the load deflection temperature (HDT) under a load of 1.82 MPa was measured according to ISO75 standard.

Long-term heat resistance: Using a small high-temperature chamber (ST-120 manufactured by ESPEC Corp.), a specimen with a size of 80 mm×40 mm and a thickness of 4 mm was left in the atmosphere at 150° C. for 2,000 hours. The bending strength of the specimen before and after the test was measured according to ISO178 standard. Then, a retention rate of bending strength (bending strength after being left for 2,000 hours/initial bending strength) was calculated.

Emissivity: The emissivity of the molded article having a size of 80 mm×40 mm and a thickness of 4 mm was measured by an emissivity measuring device (TSS-5X manufactured by Japan Sensor Corporation).

Fogging resistance: After a sample having a diameter of 26 mm and a thickness of 1 mm produced by injection molding was left in the atmosphere at 23° C. and 50% humidity for one week, three samples were placed in a glass tube (having an outer diameter of 80 mm and a height of 180 mm with an opening outer diameter of 60 mm) and a glass plate was mounted on the opening of the glass tube, and a gap between the glass tube and the glass plate was sealed with a wrap. This glass tube was immersed in an oil bath at 120° C. for 24 hours, and a gas generated during this immersion was adhered to the glass plate. Thereafter, a haze value (fogging) of the glass plate was measured with a turbidimeter (NDH-300A manufactured by Nippon Denshoku Industries Co., Ltd.), and fogging resistance was determined as follows:

○ (circle) shows a result that the haze value is less than 5%,

Δ (triangle) shows a result that the haze value is 5 to 10%, and x (cross) shows a result that the haze value is 10% or more.

As the haze value decreases, fogging in the glass plate is reduced, that is, fogging resistance is excellent. As the haze value increases, glass plate becomes foggy and fogging resistance is poor.

Flammability: In accordance with the UL94 standard shown below, a flammability test was carried out as follows. The upper end of a specimen with a size of 80 mm×40 mm and a thickness of 4 mm is clamped with a clamp to fix the specimen vertically, and a predetermined flame is applied to the lower end of the specimen for 10 seconds, then removed from the specimen, and the burning time ($1^{st}$ time) of the specimen is measured. Immediately after extinguishing the fire, the flame was applied to the lower end of the specimen again, then removed from the specimen, and the burning time ($2^{nd}$ time) of the specimen is measured. The same measurement is repeated for 5 specimens, and a total of 10 data from 5 data of the first burning time and 5 data of the second burning time are obtained. The 10 data in total is defined as T, and the maximum value among the 10 data is defined as M. In the case where T is 50 seconds or less and M is 10 seconds or less, when the specimen is not burned up to the holding clamp, and flaming drips fall onto the cotton placed 12 inches below the specimen but do not cause the cotton to ignite, the specimen is classified to have a flammability rating corresponding to V-0. In the case where T is 250 seconds or less, M is 30 seconds or less, and the others can satisfy the same conditions as V-0, the specimen is classified to have a flammability rating corresponding to V-1. For the thermally conductive resin composition not containing a flame retardant, the flammability is all described as a flammability rating, HB.

TABLE 1

| | Extrusion and melt-kneading | Molding process | |
| --- | --- | --- | --- |
| Thermoplastic resin (A) | Extrusion barrel temperature (° C.) | Cylinder temperature (° C.) | Mold temperature (° C.) |
| A-1 | 280 | 280 | 120 |
| Combination use of A-1 and A-2 | 280 | 280 | 100 |
| Combination use of A-1 and A-3 | 280 | 280 | 120 |

Examples 1 to 16

The thermoplastic resins (A-1) to (A-3) were dried by a hot air drier at 140° C. for 4 hours. Then, mixtures of the components shown in Table 2 were prepared based on weight ratios shown in Table 2. Then, 0.3 parts by weight of a phenol-based stabilizer (AO-60 manufactured by ADEKA CORPORATION) and 0.3 parts by weight of a phosphorus-based antioxidant (ADK STAB (trademark) PEP-36 manufactured by ADEKA CORPORATION) were added to 100 parts by weight of the resin composition. The resulting mixture was melt-kneaded by a co-rotating, fully intermeshing 25 mm twin-screw extruder MFU25TW-60HG-NH-1300 manufactured by Technovel Corporation at a discharge rate of 20 kg/h, a screw revolution speed of 150 rpm, and an extrusion barrel temperature shown in Table 1, thereby to obtain resin composition pellets.

The molded articles were produced by injection molding using the obtained resin composition pellets, and various evaluations were performed. The volume average particle diameters and aspect ratios of the graphite particles contained in the molded articles, and various physical property values are shown in Table 2.

Comparative Examples 1 to 5

Comparative Examples 1 to 5 were carried out in the same manner as in Example 1, except that the blending formulation in Example 1 was changed to those shown in Table 3. The volume average particle diameters and aspect ratios of the graphite particles contained in the molded articles, and various physical property values are shown in Table 3.

TABLE 2

| | | | Example | | | | | | | |
|---|---|---|---|---|---|---|---|---|---|---|
| | | | 1 | 2 | 3 | 4 | 5 | 6 | 7 | 8 |
| Thermoplastic resin (A) | A-1 | % by mass | 64 | 59 | 58.5 | 58.5 | 57 | 59 | 42 | 42 |
| | A-2 | | | | | | | | | |
| | A-3 | | | | | | | | | |
| Inorganic filler (B) | B-1 | | 30 | 40 | 40 | 40 | 40 | | 50 | 50 |
| | B-2 | | | | | | | 40 | | |
| | B-3 | | | | | | | | | |
| | B-4 | | | | | | | | | |
| Crystallization accelerator (C) | C-1 | | 1 | 1 | 1 | 1 | 1 | 1 | 1 | |
| | C-2 | | | | | | | | | 1 |
| | C-3 | | | | | | | | | |
| Additive (D) | D-1 | | | | | 0.5 | | | | |
| | D-2 | | | | | | 0.5 | | | |
| | D-3 | | | | | | | 2 | | |
| Reinforcing agent (E) | E | | 5 | | | | | | 7 | 7 |
| Flame retardant (F) | F | | | | | | | | | |
| Flame retardant auxiliary (G) | G | | | | | | | | | |
| Specific gravity | | | 1.6 | 1.6 | 1.6 | 1.6 | 1.6 | 1.6 | 1.8 | 1.8 |
| Number average molecular weight of thermoplastic resin (A) | | | 21,000 | 21,500 | 23,200 | 22,500 | 21,200 | 21,200 | 19,800 | 20,200 |
| Volume average particle diameter of graphite particles contained in molded article | | μm | 65 | 80 | 78 | 75 | 80 | 35 | 70 | 74 |
| Aspect ratio of graphite particles contained in molded article | | | 300 | 400 | 400 | 400 | 350 | 200 | 450 | 300 |
| Fixed carbon content | | % by mass | 99.9 | 99.9 | 99.9 | 99.9 | 99.9 | 999 | 99.9 | 99.9 |
| In-Plane thermal conductivity | | W/(m·K) | 8.8 | 16.8 | 16.1 | 16.4 | 15.4 | 15.3 | 26.5 | 26.1 |
| Thru-Plane thermal conductivity | | | 0.9 | 1.4 | 1.3 | 1.4 | 1.3 | 1.3 | 2.6 | 2.5 |
| Crystallinity | | % | 36 | 37 | 34 | 35 | 33 | 36 | 38 | 35 |
| Molding processability | | | ○ | ○ | ○ | ○ | Δ | Δ | Δ | Δ |
| HDT | | °C. | 217 | 192 | 191 | 192 | 185 | 191 | 232 | 231 |
| Long term heat resistance (retention rate of bending strength) | | % | 77 | 81 | 83 | 84 | 85 | 81 | 82 | 79 |
| Emissivity | | | 0.84 | 0.82 | 0.82 | 0.82 | 0.82 | 0.83 | 0.79 | 0.78 |
| Fogging resistance | | | ○ | ○ | ○ | ○ | ○ | ○ | ○ | ○ |
| Flammability | | | HB | HB | HB | HB | HB | HB | HB | HB |

| | | | Example | | | | | | | |
|---|---|---|---|---|---|---|---|---|---|---|
| | | | 9 | 10 | 11 | 12 | 13 | 14 | 15 | 16 |
| Thermoplastic resin (A) | A-1 | % by mass | 42.7 | 41.7 | 37 | 37 | 36.5 | 44 | 27 | 44 |
| | A-2 | | | | 5 | | 5 | | 14 | |
| | A-3 | | | | | 5 | | | | |
| Inorganic filler (B) | B-1 | | 50 | 50 | 50 | 50 | 50 | 35 | | |
| | B-2 | | | | | | | | | |
| | B-3 | | | | | | | | 40 | |
| | B-4 | | | | | | | | | 55 |
| Crystallization accelerator (C) | C-1 | | | 1 | 1 | 1 | 1 | 1 | 1 | 1 |
| | C-2 | | | | | | | | | |
| | C-3 | | 0.3 | 0.3 | | | | | | |
| Additive (D) | D-1 | | | | | | 0.5 | | | |
| | D-2 | | | | | | | | | |
| | D-3 | | | | | | | | | |

TABLE 2-continued

| | | | | | | | | | |
|---|---|---|---|---|---|---|---|---|---|
| Reinforcing agent (E) | E | | 7 | 7 | 7 | 7 | 7 | 7 | 10 |
| Flame retardant (F) | F | | | | | | | 10 | 6 |
| Flame retardant auxiliary (G) | G | | | | | | | 3 | 2 |
| Specific gravity | | | 1.8 | 1.8 | 1.8 | 1.8 | 1.8 | 1.8 | 1.9 | 2.0 |
| Number average molecular weight of thermoplastic resin (A) | | | 20,500 | 20,600 | 19,200 | 18,900 | 19,300 | 19,500 | 20,200 | 20,500 |
| Volume average particle diameter of graphite particles contained in molded article | | μm | 62 | 72 | 75 | 65 | 58 | 65 | — | — |
| Aspect ratio of graphite particles contained in molded article | | | 350 | 400 | 350 | 350 | 350 | 300 | — | — |
| Fixed carbon content | | % by mass | 99.9 | 99.9 | 99.9 | 99.9 | 99.9 | 99.9 | — | — |
| In-Plane thermal conductivity | | W/(m · K) | 26.6 | 27.4 | 25.9 | 27.2 | 25.6 | 14.5 | 2.7 | 1.0 |
| Thru-Plane thermal conductivity | | | 2.6 | 2.6 | 2.5 | 2.5 | 2.5 | 1.5 | 0.6 | 1.0 |
| Crystallinity | | % | 38 | 41 | 39 | 42 | 37 | 36 | 39 | 36 |
| Molding processability | | | Δ | Δ | ○ | ○ | Δ | ○ | ○ | ○ |
| HDT | | °C. | 232 | 234 | 229 | 221 | 227 | 227 | 215 | — |
| Long term heat resistance (retention rate of bending strength) | | % | 82 | 81 | 79 | 81 | 80 | 80 | 87 | — |
| Emissivity | | | 0.78 | 0.79 | 0.79 | 0.8 | 0.79 | 0.83 | 0.88 | — |
| Fogging resistance | | | ○ | ○ | Δ | ○ | ○ | ○ | ○ | ○ |
| Flammability | | | HB | HB | HB | HB | HB | V-0 | V-0 | HB |

TABLE 3

| | | | Comparative Example | | | | |
|---|---|---|---|---|---|---|---|
| | | | 1 | 2 | 3 | 4 | 5 |
| Thermoplastic resin (A) | A-1 | % by mass | 65 | 60 | 43 | 27 | 44 |
| | A-2 | | | | | 14 | |
| | A-3 | | | | | | |
| Inorganic filler (B) | B-1 | | 30 | 40 | 50 | | |
| | B-2 | | | | | | |
| | B-3 | | | | | 40 | |
| | B-4 | | | | | | 55 |
| Crystallization accelerator (C) | C-1 | | | | | | |
| | C-2 | | | | | | |
| | C-3 | | | | | | |
| Additive (D) | D-1 | | | | | | |
| | D-2 | | | | | | |
| | D-3 | | | | | | |
| Reinforcing agent (E) | E | | 5 | | 7 | 10 | |
| Flame retardant (F) | F | | | | | 6 | |
| Flame retardant auxiliary (G) | G | | | | | 2 | |
| Specific gravity | | | 1.6 | 1.6 | 1.8 | 1.9 | 2.0 |
| Number average molecular weight of thermoplastic resin (A) | | | 21,000 | 20,500 | 20,100 | 20,500 | 20,800 |
| Volume average particle diameter of graphite particles contained in molded article | | μm | 70 | 75 | 70 | — | — |
| Aspect ratio of graphite particles contained in molded article | | | 300 | 400 | 400 | — | — |
| Fixed carbon content | | % by mass | 99.9 | 99.9 | 99.9 | — | — |
| In-Plane thermal conductivity | | W/(m · K) | 6.6 | 12.2 | 22.8 | 2.5 | 0.9 |
| Thru-Plane thermal conductivity | | | 0.9 | 1.3 | 2.5 | 0.6 | 0.8 |
| Crystallinity | | % | 28 | 29 | 29 | 35 | 29 |
| Molding processability | | | ○ | ○ | Δ | ○ | ○ |
| HDT | | °C. | 215 | 193 | 231 | 216 | — |
| Long term heat resistance (retention rate of bending strength) | | % | 79 | 81 | 82 | 87 | — |
| Emissivity | | | 0.84 | 0.82 | 0.79 | 0.88 | — |
| Fogging resistance | | | ○ | ○ | ○ | ○ | ○ |
| Flammability | | | HB | HB | HB | V-0 | HB |

Comparison between Example 1 and Comparative Example 1 shows that the crystallinity of the thermoplastic resin (A) is improved and the thermal conductivity value is increased by adding a crystallization accelerator. Further, it is understood that in Example 1, the fogging resistance is also good, and other physical properties such as heat resistance are retained, too. The same can be said from the comparison between Example 2 and Comparative Example 2; Example 7 and Comparative Example 3; Example 15 and Comparative Example 4; and Example 16 and Comparative Example 5. In addition, from the comparison between Example 8 and Example 12, it was revealed that by using polyethylene terephthalate and polybutylene terephthalate in combination in the thermoplastic resin (A), the crystallinity of the thermoplastic resin (A) can be further enhanced, and the thermal conductivity as well as the molding processability can also be improved.

Regarding the type of the inorganic filler (B), it can be said that the thermal conductivity is more largely increased by using graphite having high thermal conductivity, and thus the effect of the present invention can be more remarkably exhibited. As for the graphite, from comparison between Example 2 and Example 6, it is revealed that the particle diameter of the graphite particles contained in the resin composition after molding process can be kept high by using graphite having a large particle diameter such that the volume average particle diameter of graphite before melt-kneading is 201 μm or more, so that the thermal conductivity and molding processability are improved.

Examples 17 to 19

Figure 7A:
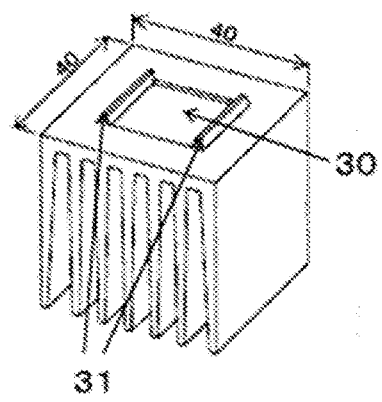
FIGS. 7(a), 7(b), and 7(c) are schematic diagrams showing a configuration of a heat sink produced in examples.
Figure 7B:
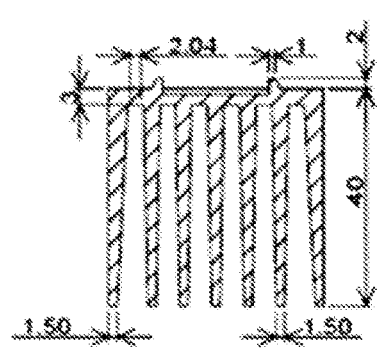
Figure 7C:
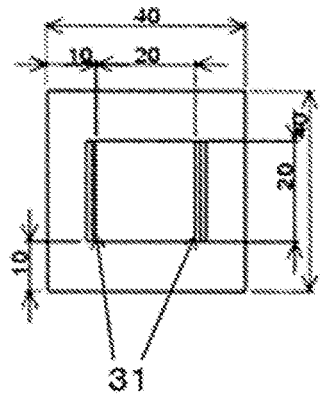

The heat dissipation of the heat sink was confirmed. The heat sinks described in FIGS. 7(a) to 7(c) were produced from the pellets of the thermally conductive resin compositions obtained in Examples 2, 3 and 7 using an injection molding machine [Si-100, manufactured by Toyo Machinery & Metal Co., Ltd.]. After uniformly applying a thermal interface material having a thermal conductivity of 2 W/(m·K) to the entire recessed part provided on the upper surface portion of the heat sink shown in FIG. 7 to a thickness of 0.1 mm or less. Thereafter, an aluminum plate with a size of 20 mm×20 mm and a thickness of 1 mm was installed on its upper surface. After the installation, ultrasonic welding of the rib part of the heat sink was performed to fix the aluminum plate, and a heating element having a size of 5 mm×5 mm and a thickness of 2 mm was installed at the center of the aluminum plate. The fins of the heat sink were fixed so that they faced down, and a heat load of 10 W was applied to the heating element under an atmosphere of 20° C. After standing for 2 hours, the temperature of the heating element was measured. The temperature of each heating element is shown in Table 4.

Comparative Examples 6 and 7

The procedure of Example 17 was repeated except that the blending formulation in Example 17 was changed to those shown in Table 4. The temperature of each heating element is shown in Table 4.

TABLE 4

|  |  | Example | | | Comparative Example | |
| --- | --- | --- | --- | --- | --- | --- |
|  |  | 17 | 18 | 19 | 6 | 7 |
| Blending formulation |  | Example 2 | Example 3 | Example 7 | Comparative Example 2 | Comparative Example 3 |
| Temperature of heating element | ° C. | 92.3 | 92.8 | 85.4 | 94.6 | 87.2 |

From Example 17 and Comparative Example 6, and from Example 19 and Comparative Example 7, it is understood that by adding a crystallization accelerator, the thermal conductivity is high, the temperature of the heating element is low, and the heat dissipation property is improved. In each of the examples, it can be found that the temperature of the heating element is 100° C. or less and the heat dissipation property is excellent.

The thermally conductive resin composition of one or more embodiments of the present invention has excellent thermal conductivity, superior molding processability, and low specific gravity, so that such a resin composition can be used as a substitute for metals in applications. From the thermally conductive resin composition of one or more embodiments of the present invention, it is possible to easily and inexpensively obtain a lightweight molded article which is high in the degree of freedom of shape. In addition, the thermally conductive resin composition of one or more embodiments of the present invention is also excellent in electromagnetic shielding properties, and is suitable for applications requiring electromagnetic shielding properties, too. Further, the thermally conductive resin composition of one or more embodiments of the present invention has high heat resistance and fogging resistance, and is suitable for various applications such as a heat dissipation casing, a heat dissipation chassis, an automotive LED lamp heat sink, and the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Heat dissipation casing for housing camera.
2 Box-shaped heat dissipation casing
3, 4 Heat sinks for housing LED lamp
5 Heat sink
10 First cylindrical body
11 Second cylindrical body
12 First heat dissipation fin
13 Second heat dissipation fin
14 Opening
15 Body
16, 17 Heat dissipation fins
18 Support plate
19 Frame
20 Heat dissipation fin
21a, 21b Ribs
22 Support plate
23 Recessed part
24a, 24b Protrusions
25 Plate-like heat dissipation fin
26 LED module
27 Circuit board
28 Heat sink base
29 Heat sink fin
30 Upper surface of heat sink
31 Ribs

The invention claimed is:

1. A thermally conductive resin composition having a specific gravity of 1.4-2.0 and an In-Plane thermal conductivity of 1 W/(m·K) or higher, the thermally conductive resin comprising:
(A) 30-90% by mass of a thermoplastic resin that is one or more resins selected from the group consisting of polybutylene terephthalate, polyethylene terephthalate, and polyester-polyether copolymer, (B) 9-69% by mass of an inorganic filler having a thermal conductivity of 1 W/(m·K) or higher, and (C) 0.05-10% by mass of a crystallization accelerator, wherein the inorganic filler (B) is a flacked graphite having a volume average particle diameter from 10 to 700 μm, a fixed carbon content of 98% by mass or more, and an aspect ratio of 21 or more.

2. The thermally conductive resin composition according to claim 1, wherein the hacked graphite is natural graphite.

3. The thermally conductive resin composition according to claim 1, wherein the polybutylene terephthalate, polyethylene terephthalate, and polyester-polyether copolymer have a number average molecular weight from 12,000 to 70,000.

4. The thermally conductive resin composition according to claim 1, further comprising 0.01 to 5% by mass of at least one compound selected from the group consisting of an epoxy compound, a carbodiimide compound, and an oxazoline compound.

5. The thermally conductive resin composition according to claim 1, wherein the crystallization accelerator (C) is an organic crystallization accelerator.

6. The thermally conductive resin composition according to claim 5, wherein the organic crystallization accelerator is an organic nitrogen compound or an ester compound having a number average molecular weight of from 200 to 10,000.

7. A method of producing the thermally conductive resin composition as defined in claim 1, comprising melt-kneading each component to produce the thermally conductive resin composition.

8. A heat dissipation casing composed of the thermally conductive resin composition as defined in claim 1.

9. A heat dissipation chassis composed of the thermally conductive resin composition as defined in claim 1.

10. An automotive LED lamp heat sink composed of the thermally conductive resin composition as defined in claim 1.

* * * * *